US012632459B1

(12) United States Patent
Silbermann et al.

(10) Patent No.: US 12,632,459 B1
(45) Date of Patent: May 19, 2026

(54) MANAGEMENT OF OBJECTS ACCORDING TO USER CONTEXT

(71) Applicant: Pinterest, Inc., San Francisco, CA (US)

(72) Inventors: Ben Silbermann, Palo Alto, CA (US); Evan Howell Sharp, San Francisco, CA (US); Paul Sciarra, San Francisco, CA (US); Jon Jenkins, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 735 days.

(21) Appl. No.: 16/673,779

(22) Filed: Nov. 4, 2019

Related U.S. Application Data

(63) Continuation of application No. 13/774,999, filed on Feb. 22, 2013, now Pat. No. 10,467,237.

(60) Provisional application No. 61/725,462, filed on Nov. 12, 2012.

(51) Int. Cl.
G06F 16/248 (2019.01)

(52) U.S. Cl.
CPC .................................. G06F 16/248 (2019.01)

(58) Field of Classification Search
CPC .................................................... G06F 16/248
USPC ......................................................... 707/722
See application file for complete search history.

(56) References Cited

U.S. PATENT DOCUMENTS

| | | | |
|---|---|---|---|
| 6,301,586 B1 | 10/2001 | Yang et al. | |
| 6,430,563 B1 * | 8/2002 | Fritz | G06F 16/9558 707/696 |

| | | | |
|---|---|---|---|
| 6,578,072 B2 | 6/2003 | Watanabe et al. | |
| 6,625,581 B1 * | 9/2003 | Perkowski | G06Q 30/0234 709/200 |
| 6,958,821 B1 * | 10/2005 | McIntyre | G06V 10/56 707/E17.02 |
| 7,443,418 B2 * | 10/2008 | Bryant | H04N 1/00183 705/37 |
| 7,668,913 B1 | 2/2010 | Underwood et al. | |
| 7,831,548 B1 | 11/2010 | Round et al. | |
| 8,121,902 B1 * | 2/2012 | Desjardins | G06Q 30/0282 705/26.1 |
| 8,321,795 B2 * | 11/2012 | Blanco | G06Q 30/02 715/749 |
| 8,386,335 B1 * | 2/2013 | Cohen | G06Q 10/10 705/26.7 |
| 8,405,740 B2 * | 3/2013 | Nichols | H04N 5/772 348/231.2 |
| 8,554,601 B1 | 10/2013 | Marsh et al. | |
| 8,671,353 B1 * | 3/2014 | Varadarajan | G06F 3/0482 715/763 |
| 8,965,788 B2 * | 2/2015 | Gonsalves | G06Q 30/02 705/14.54 |
| 9,329,746 B2 | 5/2016 | Lee et al. | |

(Continued)

*Primary Examiner* — Sherief Badawi
*Assistant Examiner* — Jessica N Le
(74) *Attorney, Agent, or Firm* — Gustafson IP

(57) ABSTRACT

This disclosure describes, in part, systems and methods that enable users to manage, search for, share and discover objects based on a context of the object from the user's perspective. The same object may have vastly different meanings (context) to different individuals based on how they experience the object. Rather than managing objects solely based on information about the object, the implementations described allow users to specify a context for the object and manage objects based on that context. In addition, external sources may provide supplemental information about objects and/or representations of objects.

21 Claims, 19 Drawing Sheets

(56) References Cited

U.S. PATENT DOCUMENTS

| | | | |
|---|---|---|---|
| 9,418,050 B1 * | 8/2016 | Brewster | G06F 16/958 |
| 9,436,754 B1 * | 9/2016 | Hu | G06F 16/907 |
| 9,481,050 B2 | 11/2016 | Brine et al. | |
| 9,760,916 B1 * | 9/2017 | Shapiro | G06Q 30/06 |
| 9,846,877 B2 * | 12/2017 | Khan | G06Q 20/204 |
| 10,108,696 B1 * | 10/2018 | Hu | G06F 16/907 |
| 10,467,237 B1 * | 11/2019 | Silbermann | G06F 16/248 |
| 10,990,764 B2 * | 4/2021 | Ranatunga | G06N 20/00 |
| 11,386,479 B1 * | 7/2022 | Gavini | H04W 4/023 |
| 11,928,133 B2 * | 3/2024 | Hu | G06F 16/907 |
| 2002/0052783 A1 | 5/2002 | Turek et al. | |
| 2002/0059098 A1 | 5/2002 | Sazawa et al. | |
| 2002/0147661 A1 * | 10/2002 | Hatakama | G06Q 30/0643 |
| | | | 705/26.8 |
| 2003/0065531 A1 | 4/2003 | Satomi et al. | |
| 2003/0204447 A1 | 10/2003 | Dalzell et al. | |
| 2004/0260614 A1 * | 12/2004 | Taratino | G06Q 40/00 |
| | | | 705/26.8 |
| 2006/0136456 A1 | 6/2006 | Jacobs et al. | |
| 2007/0016575 A1 | 1/2007 | Hurst-Hiller et al. | |
| 2007/0226255 A1 | 9/2007 | Anderson | |
| 2007/0233556 A1 | 10/2007 | Koningstein | |
| 2007/0288497 A1 | 12/2007 | Droznin et al. | |
| 2008/0082426 A1 * | 4/2008 | Gokturk | G06Q 30/0623 |
| | | | 707/E17.014 |
| 2008/0288332 A1 * | 11/2008 | Altounian | G06Q 30/0601 |
| | | | 705/26.4 |
| 2009/0031209 A1 | 1/2009 | Rapoport | |
| 2009/0037355 A1 | 2/2009 | Brave et al. | |
| 2009/0248883 A1 | 10/2009 | Suryanarayana et al. | |
| 2009/0254845 A1 | 10/2009 | Weiss et al. | |
| 2010/0049707 A1 | 2/2010 | Faria et al. | |
| 2010/0153848 A1 | 6/2010 | Saha | |
| 2010/0179857 A1 * | 7/2010 | Kalaboukis | G06Q 20/208 |
| | | | 705/26.1 |
| 2010/0191728 A1 * | 7/2010 | Reilly | G06T 11/60 |
| | | | 707/E17.019 |
| 2010/0217757 A1 * | 8/2010 | Fujioka | G06F 16/9535 |
| | | | 705/26.1 |
| 2011/0066497 A1 * | 3/2011 | Gopinath | G06Q 30/02 |
| | | | 705/14.53 |
| 2011/0072025 A1 | 3/2011 | Zwol et al. | |
| 2011/0083098 A1 | 4/2011 | Cisler et al. | |
| 2011/0143707 A1 * | 6/2011 | Darby, Jr. | H04W 4/185 |
| | | | 455/404.2 |
| 2011/0184972 A1 * | 7/2011 | Ard | G06F 16/26 |
| | | | 707/769 |
| 2011/0191206 A1 * | 8/2011 | Kiarostami | G06Q 30/0633 |
| | | | 705/26.8 |
| 2011/0238681 A1 * | 9/2011 | Krishnan | G06F 16/93 |
| | | | 707/E17.02 |
| 2011/0276396 A1 * | 11/2011 | Rathod | G06Q 30/0282 |
| | | | 707/706 |
| 2011/0276452 A1 * | 11/2011 | Stephens | G06Q 10/087 |
| | | | 705/35 |
| 2011/0302152 A1 | 12/2011 | Boyd et al. | |
| 2011/0320317 A1 * | 12/2011 | Yuan | G06Q 30/0603 |
| | | | 705/26.61 |
| 2012/0062595 A1 * | 3/2012 | Oh | G06V 30/142 |
| | | | 345/633 |
| 2012/0078731 A1 | 3/2012 | Linevsky et al. | |
| 2012/0102418 A1 * | 4/2012 | Joy | G06F 16/4393 |
| | | | 726/30 |
| 2012/0109740 A1 | 5/2012 | Wagenblatt et al. | |
| 2012/0117473 A1 | 5/2012 | Han et al. | |
| 2012/0151383 A1 * | 6/2012 | Kazan | G06Q 10/101 |
| | | | 715/753 |
| 2012/0191577 A1 | 7/2012 | Gonsalves et al. | |
| 2012/0210220 A1 * | 8/2012 | Pendergast | G06F 3/0482 |
| | | | 715/716 |
| 2012/0232954 A1 | 9/2012 | Calman et al. | |
| 2012/0233076 A1 * | 9/2012 | Sutcliffe | G06Q 30/02 |
| | | | 705/50 |
| 2012/0265644 A1 | 10/2012 | Roa et al. | |
| 2012/0284290 A1 | 11/2012 | Keebler et al. | |
| 2012/0296739 A1 | 11/2012 | Cassidy et al. | |
| 2012/0300974 A1 * | 11/2012 | Rodriguez | G06T 1/0092 |
| | | | 382/100 |
| 2012/0327252 A1 | 12/2012 | Nichols et al. | |
| 2012/0327265 A1 | 12/2012 | Arujunan et al. | |
| 2013/0003126 A1 * | 1/2013 | Van Osdol | G06F 3/1288 |
| | | | 358/1.15 |
| 2013/0054365 A1 * | 2/2013 | Sabur | G06Q 50/01 |
| | | | 705/347 |
| 2013/0054709 A1 * | 2/2013 | Sabur | G06Q 10/06 |
| | | | 709/206 |
| 2013/0117088 A1 * | 5/2013 | Madsen | G06Q 30/02 |
| | | | 705/14.39 |
| 2013/0117152 A1 | 5/2013 | Mebed et al. | |
| 2013/0138424 A1 * | 5/2013 | Koenig | G10L 21/00 |
| | | | 704/9 |
| 2013/0144766 A1 * | 6/2013 | Suzuki | G06Q 30/06 |
| | | | 705/27.1 |
| 2013/0147970 A1 * | 6/2013 | Herring | G06Q 30/0601 |
| | | | 348/207.1 |
| 2013/0159081 A1 * | 6/2013 | Shastry | G06Q 20/384 |
| | | | 705/14.23 |
| 2013/0185294 A1 * | 7/2013 | Kami | G06Q 30/0282 |
| | | | 707/732 |
| 2013/0191211 A1 | 7/2013 | Nichols et al. | |
| 2013/0204866 A1 | 8/2013 | Fork et al. | |
| 2013/0226710 A1 | 8/2013 | Plut | |
| 2013/0226995 A1 * | 8/2013 | Etheredge | G01L 27/00 |
| | | | 709/203 |
| 2014/0063237 A1 * | 3/2014 | Stone | H04N 7/181 |
| | | | 382/190 |
| 2014/0067542 A1 | 3/2014 | Everingham | |
| 2014/0074836 A1 * | 3/2014 | Adams | G06F 16/48 |
| | | | 707/736 |
| 2014/0122228 A1 * | 5/2014 | Wical | G06Q 30/02 |
| | | | 705/14.53 |
| 2014/0122460 A1 | 5/2014 | Squedin et al. | |
| 2014/0129570 A1 * | 5/2014 | Johnson | H04N 21/84 |
| | | | 707/754 |
| 2015/0026642 A1 * | 1/2015 | Wilson | G06F 3/0482 |
| | | | 715/825 |
| 2015/0070347 A1 * | 3/2015 | Hofmann | G06F 3/04815 |
| | | | 345/419 |
| 2015/0100578 A1 * | 4/2015 | Rosen | G06Q 10/1093 |
| | | | 707/737 |
| 2015/0127628 A1 * | 5/2015 | Rathod | G06Q 30/0251 |
| | | | 707/710 |
| 2015/0169645 A1 * | 6/2015 | Li | G06F 16/532 |
| | | | 707/722 |
| 2015/0248719 A1 * | 9/2015 | Hansen | G06F 3/0304 |
| | | | 705/26.63 |
| 2017/0220532 A1 | 8/2017 | Soon-Shiong et al. | |
| 2018/0350144 A1 * | 12/2018 | Rathod | G06Q 20/3224 |
| 2019/0034832 A1 * | 1/2019 | Reimer | H04L 67/535 |
| 2019/0073389 A1 * | 3/2019 | Agrawal | G06F 16/95 |

* cited by examiner

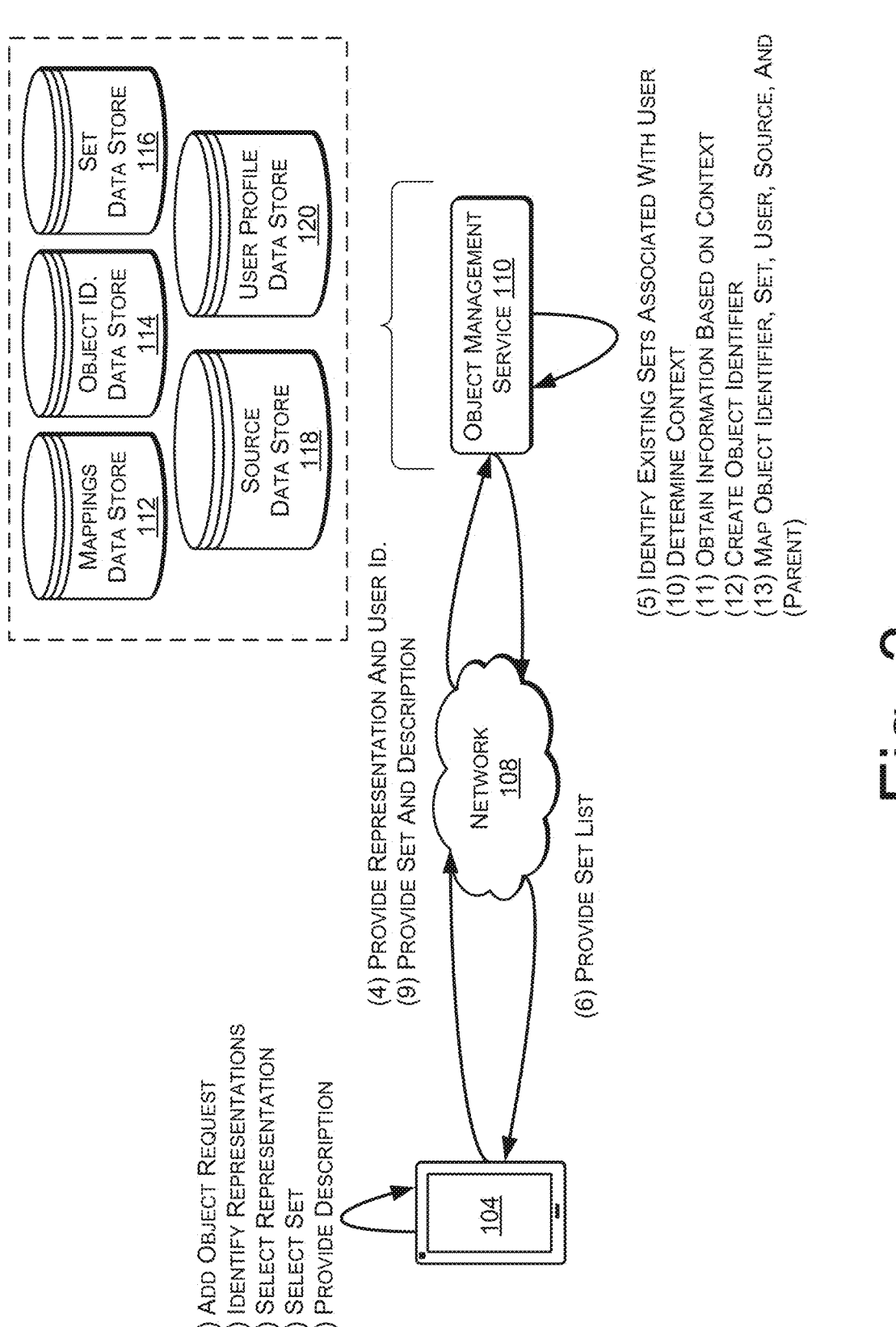

(1) ADD OBJECT REQUEST
(2) IDENTIFY REPRESENTATIONS
(3) SELECT REPRESENTATION
(7) SELECT SET
(8) PROVIDE DESCRIPTION (4) PROVIDE REPRESENTATION AND USER ID.
(9) PROVIDE SET AND DESCRIPTION (6) PROVIDE SET LIST (5) IDENTIFY EXISTING SETS ASSOCIATED WITH USER
(10) DETERMINE CONTEXT
(11) OBTAIN INFORMATION BASED ON CONTEXT
(12) CREATE OBJECT IDENTIFIER
(13) MAP OBJECT IDENTIFIER, SET, USER, SOURCE, AND (PARENT)

WEB BROWSER

File    Edit    View    Favorites http://www.webpage.com

CREATE A SET

SET NAME:        TRIP TO MAUI, HAWAII    702

OBJECT CATEGORY:    TRAVEL    706    704

DESCRIPTION:    THINGS I WANT TO DO IN HAWAII NEXT SPRING    708

WHO CAN ADD?    710

712 —— CREATOR: JON SMITH

CREATE SET    714

DETERMINE AND ASSOCIATE
OBJECT CONTEXT SUB-PROCESS
1400

RETRIEVE OBJECT INFORMATION
1402

RETRIEVE SET INFORMATION
AND CONTEXT
1404

OTHER
OBJECT IDENTIFIERS
ASSOCIATED WITH SET?
1406

No

YES

RETRIEVE OBJECT INFORMATION OF OTHER
OBJECTS ASSOCIATED WITH SET
1408

PROCESS INFORMATION FOR
CONTEXTUAL IDENTIFIERS
1410

DETERMINE CONTEXT FOR OBJECT
1412

ASSOCIATE CONTEXT
WITH OBJECT
1414

MANAGEMENT OF OBJECTS ACCORDING TO USER CONTEXT

This application is a continuation of U.S. patent application Ser. No. 13/774,999, filed Feb. 22, 2013, and titled "Object Relationships And Similarities Based On User Context," and claims the benefit of U.S. Provisional Application No. 61/725,462, filed Nov. 12, 2012 entitled "Management of Objects According to User Context," both of which are incorporated herein by reference in their entirety.

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Objects are typically made available and people search for objects, based on information about the object for which they are searching. Key words that describe an object are often associated with the object and when people search using one or more of those key words the object may be returned as a result. While this provides a good foundation for searching for objects based on information about the object, it limits the ability for individuals to search for, share, and experience objects in other ways.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 2-4 are block diagrams of an example implementation for creating a set, adding object identifiers to a set and accessing an object identifier, according to an implementation.

Figure 1:
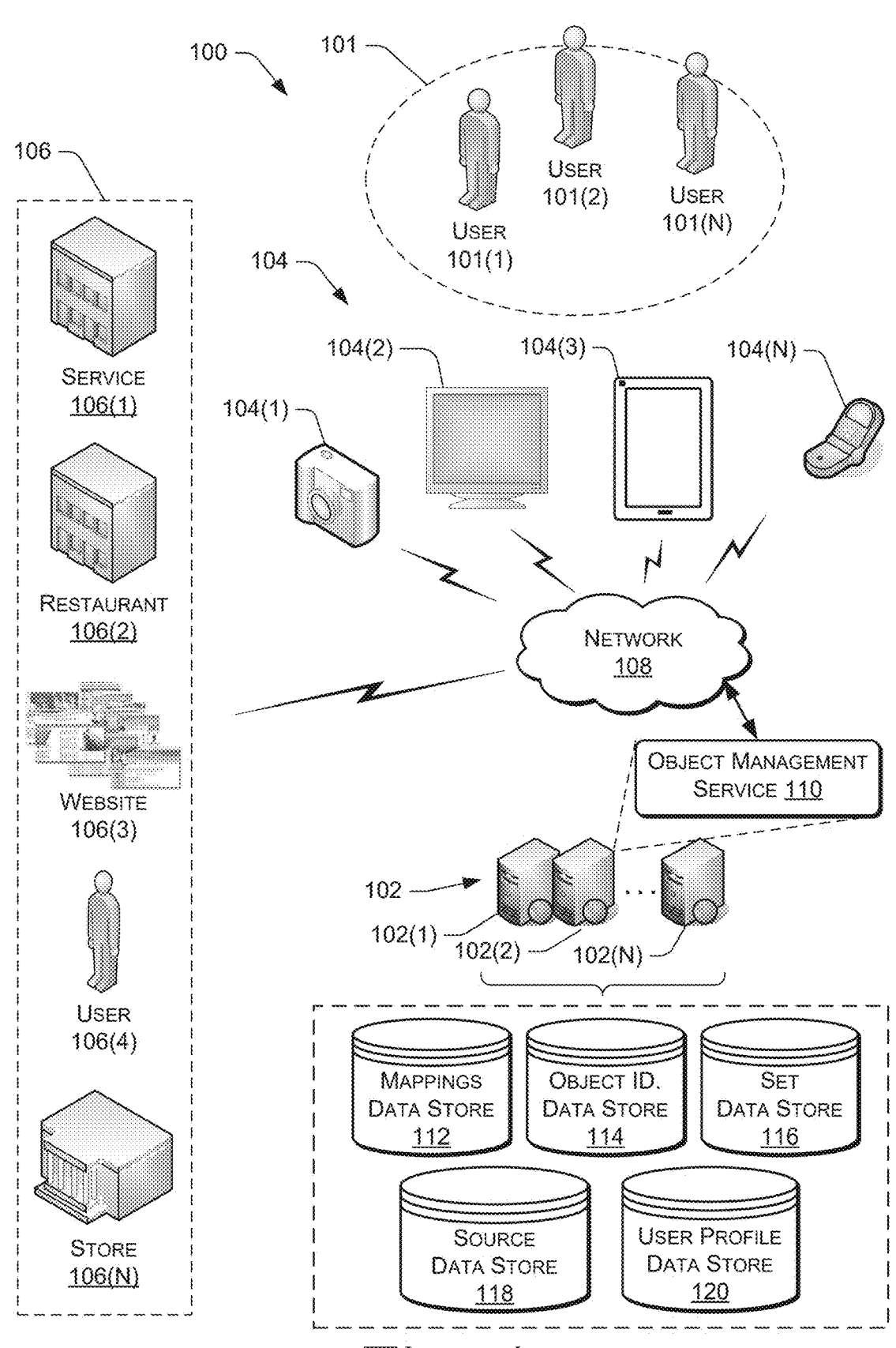
FIG. 1 is a pictorial diagram of an illustrative environment that includes a server system and a client device communicatively connected via a network.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives failing within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, systems and methods that enable users to manage, search for, share and discover objects based on a context and meaning of the object from the user's perspective. The same object may have vastly different meanings (context) to different individuals based on how they experience the object. For example, Amy, a visitor to New York, may view and experience the Empire State Building as a place she visited. In comparison, Bob, an engineer, may have the context that the Empire State Building is a great engineering achievement. As still another example, Cathy, who works in the Empire State Building, may associate the Empire State building with the context of her place of work. In each instance, the individuals have a different context for the same object.

In the above example, each user, utilizing the implementations described herein, may create an object identifier for the Empire State Building and each object identifier may have a different context (e.g., places visited, engineering achievement, place of work), because the experience for each user is different. Other users with a similar context may discover the respective object identifier based on the context. For example, another user may search for objects based on where Cathy works and discover the object identifier for the Empire State building as created by Cathy.

For purposes of discussion, an "object identifier," as used herein, is a collection of one or more items of information that identifies an object based on a user's perspective, or context. The object identifier may include any combination of: a representation for the object, such as a graphical representation, audible representation, or other representation of the object; a context for the object as understood by the user; a description of the object provided by the user; static information about the object; supplemental information about the object; the set to which the object belongs (discussed below); the source of the object; any parent object identifier from which the object identifier was created; and any identification of other similar object identifiers. As will be appreciated, additional or fewer items of information may be included in an object identifier.

As discussed in further detail herein, a context represents information about an object as understood by the user. The context explains why the object is important to the user that created the object identifier. In some implementations, context(s) may be provided directly by the user or determined based on other information provided by or about the user. Static information about an object may be any information about the object that does not change. Such information may be provided by the user, by other users, by external sources, and/or by the methods and systems described herein.

Supplemental information, as used herein, may be any additional information that may be associated with a representation of an object, an object identifier and/or a set. In some implementations, supplemental information may be periodically updated by external sources, users, and/or include actions that may be performed by users interacting with the object identifier. For example, supplemental information may include local weather at an object's location. When a user views the object identifier, the supplemental information may be automatically updated to show the current weather at the location, or the forecasted weather at the location during the time the user plans to visit.

If the supplemental information is an action, such as a link to an external source, a buy button, etc., a user may interact with the action when viewing the object identifier and have the action performed. For example, if the supplemental information is a buy button, the user can interact with the buy button and initiate the action of buying the object identified by the object identifier.

Supplemental information associated with an object identifier may be provided by one or multiple sources. For example, if the object identified by an object identifier is a television, the source of the object may be Sony, the maker of the television. Sony may provide supplemental information about the television, such as the dimensions, weight, features, etc. Other external sources, such as resellers of the television, may also be associated with and provide supplemental information for the object. For example, each seller of the television may provide supplemental information identifying their price, location, hours of operation, etc.

The methods and systems described herein further enable users to manage, search for, share and discover objects by organizing object identifiers into "sets," For example, users may create one or more sets and object identifiers may be associated with those sets. Generally, a "set" is a collection of object identifiers created by a user. In one implementation, each set may include any number of object identifiers, including zero (a null set). An object identifier may be associated with one or many sets. In one implementation, an object identifier may only be associated with one set.

Like object identifiers, sets may have a context. A set may also include a category, such as travel, sports, animals, art, education, food and drink, etc. In some implementations, the presentation of the set and corresponding object identifiers may depend on the context and/or category associated with the set. For example, a set with a travel category may present information and/or object identifiers differently than a set with clothing as a category. To illustrate, a set with a travel category may present information on a map based on a location associated with each object identifier. In comparison, a set with clothing as a category may present object identifiers based on color.

Sets may also be used to control access to object identifiers, or have other constraints. For example, a user may choose to share a set with anyone, with only friends, or with no one. A user may also specify whether other users can add object identifiers to a set created by the user and/or whether other users can create object identifiers based on existing object identifiers included in a set.

Users can create object identifiers and add them to sets based on representations for objects provided or identified by the user or by adding existing object identifiers to their own set of object identifiers. An "object" may be anything that can be represented. For example, a user may create an object identifier for a television show, an image, a physical object, a sound, a web page, a location, a digital object, and the like. Object identifiers created with representations provided or identified by a user are considered parent object identifier relationships. Object identifiers created based on existing object identifiers are considered child object identifiers. An object identifier may have any number of parent and/or child object identifiers. As discussed further below, relationships (e.g., parent/child) between object identifiers may be maintained to allow users to discover other objects and to understand the source of the object represented by an object identifier.

FIG. 1 is a pictorial diagram of an illustrative environment 100 that includes users 101, such as users 101(1), 101(2)-101(N), a server system 102 that includes one or more server computers 102(1), 102(2)-102(N), one or more client devices 104, such as client device 104(1), 104(2), 104(3)-104(N), and one or more external sources 106, such as a service offering 106(1), restaurant 106(2), website 106(3), user 106(4)-store 106(N) communicatively connected via a network 108. As will be appreciated, any number and/or type of server systems 102, client devices 104 and/or external source 106 may be included in the environment 100 and those illustrated in FIG. 1 are only exemplary. Likewise, any number of users 101 may be included in the environment 100. For purposes of this discussion, the term "user" will be used herein to refer to an individual interacting with the server system 102 and/or object management service 110 (discussed below).

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 102 may also include a mappings data store 112, an object identifier data store 114, a set data store 116, a source data store 118, and a user profile data store 120. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The mappings data store 112, object identifier data store 114, set data store 116, source data store 118, and user profile data store 120 may be integrated with the server system 102 or otherwise communicatively coupled with the server system 102. For example, one or more of the mappings data store 112, object identifier data store 114, set data store 116, source data store 118, and user profile data store 120 may be located at a remote computing resource (not shown) and communicatively coupled with the server system 102. In some implementations, the mappings data store 112, object identifier data store 114, set data store 116, source data store 118, and user profile data store 120 may include one or more CD-RW/DVD-RW drives, hard disk drives, tape drives, or other storage devices that are utilized to store digital content and information. The server system 102, separately or together with the mappings data store 112, object identifier data store 114, set data store 116, source data store 118, and user profile data store 120, may provide an object management service 110 that facilitates user 101 exploration and sharing of object identifiers, creation and management of sets into which one or more object identifiers may be included, and adding/updating of supplemental information by external sources 106 and/or the object management service 110.

In some implementations, the server system 102 may also be configured to exchange information with one or more external sources 106. The external sources 106 may include any type of entity and/or individual(s) that provides a service, product or information that may be used to supplement an object identifier and/or representation of an object. For example, external sources 106 may include a service offering 106(1), such as local weather, time, streaming video of a location, etc., restaurants 106(2), websites 106(3), users 106(4) and stores 106(N), such as a toy store, grocery store, electronic commerce (e-commerce) store, bookstore, etc. External sources may be associated with a fixed location(s), such as their place of business, a location that may change (e.g., hiking guide, mobile health provider) depending on the external sources' current location, or no location at all (e.g., digital or virtual business). Digital or virtual businesses, such as websites 106(3), include any form of e-commerce or other digital offering that may provide supplemental information.

For example, an e-commerce site may provide a shopping cart or purchase button, also referred to herein as a buy button, (supplemental information) that can be used to initiate an action to purchase the object. A user, when viewing the object identifier that includes a representation of the object with which the e-commerce site has associated a purchase button, may interact with that supplemental information and initiate a purchase of the object represented by the object identifier.

As another example, a user 101 may view an object identifier for the Eifel Tower. A weather service, which is an external source 106, may provide supplemental information in the form of current weather at the Eifel Tower that is associated with the object identifier and provided to the user 101 when viewing the object identifier for the Eifel Tower.

In some implementations, the external source 106 may interact with the object management service 110 and provide representations for objects along with supplemental information that could then be used to form object identifiers for users. For example, if the external source 106 is a boutique home furnishing store, the home furnishing store may provide graphical representations for each object they offer for sale in the store along with supplemental information for each object. The supplemental information may include, among other things, information about the object (e.g., description, size, price, color), information about the boutique home furnishing store (e.g., hours of operation, location, phone number), and one or more actions (e.g., buy button, contact store button).

As users are in the boutique home furnishing store, they may request to add an object identifier for one of the objects in the store to a set. For example, a user may take a picture of a table in the boutique home furnishing store and submit a request to the object management service 110 to add a representation of the table to a set the user has created called "Stuff For Mv Vacation Home." The object management service 110, upon receiving the request, may identify the object and use some or all of the supplemental information provided by the boutique home furnishing store to create an object identifier that is added to the user's set called "Stuff For My Vacation Home." In some implementations, the object may be identified based on image processing to identify the object, the location of the user when the image of the object was captured or the request was submitted, an identifier included in the image (e.g. a bar code, QR code, or other identifier), near field communication ("NFC") and/or RFID Tags included on or near the objects, and/or a combination thereof.

The external source may also periodically update one or more items of supplemental information. Those updates are reflected in the object identifiers that include the representation and/or supplemental information provided by the external source. For example, the boutique home furnishing store may periodically update the price of an object. The updated price will be reflected in each object identifier that includes the supplemental information of price for that object.

Returning to FIG. 1, client devices 104 may include personal computers, tablet computers, eBook reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 102 is configured to exchange data and information, including information about users, sets, representations, object identifiers, and other like information with the client device 104. For example, the object management service 110 may interact via the server system 102 to determine a user's location, provide representations of objects near the user's location, enable a user to select a representation of an object, create an object identifier and include that object identifier in a user's set of object identifiers.

Likewise, a user 101 may interact with the object management service 110, via a client device 104, to create, discover and view object identifiers and sets of object identifiers, obtain information about (or purchase) objects identified by an object identifier, and/or to communicate with others. For example, a user 101, Steve in this example, may submit a request to create an object identifier for a race car by providing an image (representation) of the race car and add that object identifier to his set called Birthday Celebration. The user, Steve, may provide a description, such as "The race car 1 drove for my birthday present!" for inclusion in the object identifier. The client device 104 may determine and provide the user's location information and the request to the object management service 110. The object management service 110 may receive the information, determine a context for the object identifier based on the representation, the description provided by Steve, the context associated with the set with which the object identifier is to be associated, and optionally the location information. In this example, the object management service 110 may determine that the context for the object identifier is birthdays, special events, and/or things done by Steve. An object identifier that includes the representation, description and/or context(s) may then be established by the object management service 110 and associated with Steve's set of object identifiers called Birthday Celebration.

In addition, in some implementations, supplemental information provided by an external source may be associated with the object identifier and updated any time the creator of the object identifier, in this example Steve, or another user, views the object identifier. For example, the race car driving school that provides opportunities for people to experience the thrill of driving a race car may provide supplemental information, such as contact information, location, website, pricing, etc., that is associated with the representation of the race car and, as a result, included in the object identifier created by Steve that includes the representation of the race car.

Other users of the object management service 110 may interact with the same or different client device 104 and explore the object management service 110. A user with a similar context, or an understanding of Steve's context, can then discover the object identifier. For example, if the user's friend, Greg, searched for things Steve did on his birthday, Greg would locate the object identifier of the race car, because it has a context that relates it to Steve's birthday and things Steve did on his birthday.

If supplemental information is associated with the object identifier, that information may be updated and current supplemental information provided to Greg, or any other user, when viewing the object identifier. In some examples, the supplemental information may be updated based on information about the user viewing the object identifier, regardless of whether they were the creator of the object identifier. Continuing with the above example, if the race car driving school has multiple locations, the supplemental information regarding location, contact information, etc. may be updated to represent the location of the race car school that is nearest to the user currently viewing the object identifier. For example, Steve may have driven the race car at a school in California and when he views the object identifier receives information about the California school. However, when Greg, who is located in Texas, views the object identifier, he receives supplemental information about the Texas school.

In some implementations, object identifiers and/or sets may also be presented differently based on the client device 104 used to access the object management service 110 for example, if the client device 104 is a portable device with limited display space and/or capabilities, object identifiers may be displayed with reduced information (e.g., only the representation). In comparison, if the client device 104 is a laptop, desktop, television or other device with a larger display, additional information, such as supplemental information, may be presented. Additional details on various implementations for viewing object identifiers and supplemental information are provided below with respect to FIGS. 15-16.

The mappings data store 112 stores information about the relationships between object identifiers, sets, users, representations and external sources that provide supplemental information. For example, for each object identifier a link or other reference to the source of the object represented by the object identifier is maintained. Likewise, if the object identifier was added to a user's set from another object identifier, not only is the relationship between the user's set and the object identifier maintained, a link between the prior object identifier (the parent) and the current object identifier is also maintained. In some implementations, there may be a chain of relationships/links between multiple object identifiers, each link representing a parent object identifier from which the current object identifier was created.

For example, user A may create an object identifier representing the Empire State Building and include an image of the Empire State Building (representation) taken by user A. That object identifier may be associated with user A's set of object identifiers called "Buildings I Visited on Vacation." User A may also provide a description for the object identifier, supplemental information may be associated with the object identifier and/or a context may be established for the object identifier.

User B may view user A's object identifier and create their own object identifier by selecting to add user A's object identifier to one of user B's sets of object identifiers. In this example, a new object identifier is created for user B that includes the representation of the Empire State Building from user A's object identifier and is associated with one of user B's sets. User B may utilize the description provided by user A or add his/her own description. The object management service 110 may determine a context for user B's object identifier based on information about the set to which user B added the object identifier, the description chosen or added by user B and/or other information that will enable the object management service 110 to determine a context for user B's object identifier that provides meaning to the object identifier from the perspective of user B. In other implementations, user B may provide the context. A link or other relationship between user A's object identifier and user B's object identifier is maintained in the mappings data store 112.

Similar to the link maintained between the two object identifiers for the Empire State Building as established by user A and user B, another user, user C, may view either of the object identifiers and create another object identifier in a similar manner. Generally, any number of object identifiers may be added to sets of object identifiers that utilize information, such as a representation of the object, from another object identifier. In such examples, a link or other relationship between the object identifiers is maintained in the mappings data store 112.

The object identifier data store 114 maintains information about each object identifier created by the object management service 114. For example, for each object identifier the object management service 110 may store in the object identifier data store 114 information as to the representation included in the object identifier, the set to which the object identifier is associated, the user that created the object identifier, the context for the object identifier, any user provided description for the object identifier, any supplemental information associated with the object identifier, the source of the representation included in the object identifier and any parent object identifier from which information was obtained. Additional description about the object identifiers is provided below with respect to FIG. 5.

The set data store 116 includes information about each set established by users of the object management service 110. As discussed above, a set is a collection of object identifiers that a user creates. A set may be a null set that does not include any object representations. Likewise, any number of object identifiers nav be associated with a set. The set data store 116 for each set stores information that identifies the user that created the set, the context for the set, a category for the set, any user provided description for the set, any static information associated with the set and an identification of objects associated with the set. Additional description about sets is provided below with respect to FIG. 5.

The source data store 118 stores information about sources of objects that are represented by object identifiers managed by the object management service 110 and/or information about external sources that provide supplemental information associated with representations of one or more objects. In some examples, the source may be a website from which an image was obtained to create an object identifier. In other examples, the source may be a physical location. In still other examples, a source may be any external entity that provides supplemental information that is associated with representations of objects. For example, an external source may be a weather service that provides current weather information that is periodically updated and provided to users when viewing object identifiers for objects at specific locations.

The source data store 118 may include any form of information about each source including, but not limited to, the name of the source, whether the source has been verified by the object management service 110, the type of information provided by the source, identification of representations associated with the source, and the like.

The user profiles data store 120 stores information about users 101 of the object management service 110. Any type of information may be stored in the user profile data store 120. For example, user profile information, such as attributes, name, address, gender, browse history, object identifier history, set history, social networks and/or friends with which the user 101 interacts, and the like may be stored in the user profiles data store 120. User profile information may be provided directly by users 102 and/or collected from users 102 of the client devices 104 when interacting with the object management service 110 (e.g., clickstream data as the user explores the object management service 110), when viewing, creating or interacting with sets, when viewing, creating or interacting with object identifiers, and/or when sharing information with friends or social communities through the object management service 110. In some implementations, user information may be obtained from external sources. For example, user profile information may be obtained from a third party with which the user is also affiliated (e.g., e-commerce web site, social network) and has agreed to allow sharing of some or all user profile information provided to that third party and/or collected by that third party. In some implementations, users of the object management service 110 may choose to limit the amount of information included in their user profile, to limit access to their user profile information and/or to limit what information is shared, if any, from their user profile information.

The user profile information maintained in the user profile data store 120 may be used by the object management service 110 in determining contexts for sets of objects created by the user, determining contexts for object identifiers created by the user and/or in identifying object identifiers that may be of interest to the user. For example, a user's age, hobbies and/or occupation information may be used as a factor, along with other information, in determining context(s) for an object identifier created by the user.

In addition to maintaining information about mappings, object identifiers, sets, sources, and users, the object management service 110 may provide use information back to the users 101 and/or the external sources 106. For example, the object management service 110, through communication between the server system 102 and a client device 104, may provide use information back to a user 101. Such information may include an identification of object identifiers recently viewed, created or added, identification of others that have viewed the user's sets, object identifiers, and the like. Likewise, the object management service 110, through communication between the server system 102 and the external sources 106, may provide information to the external sources 106. Such information may include analytics about representations of objects associated with the external source 106, other external sources that may be associated with and provide supplemental information for an object with which the external source is associated, and the like.

Figure 2:
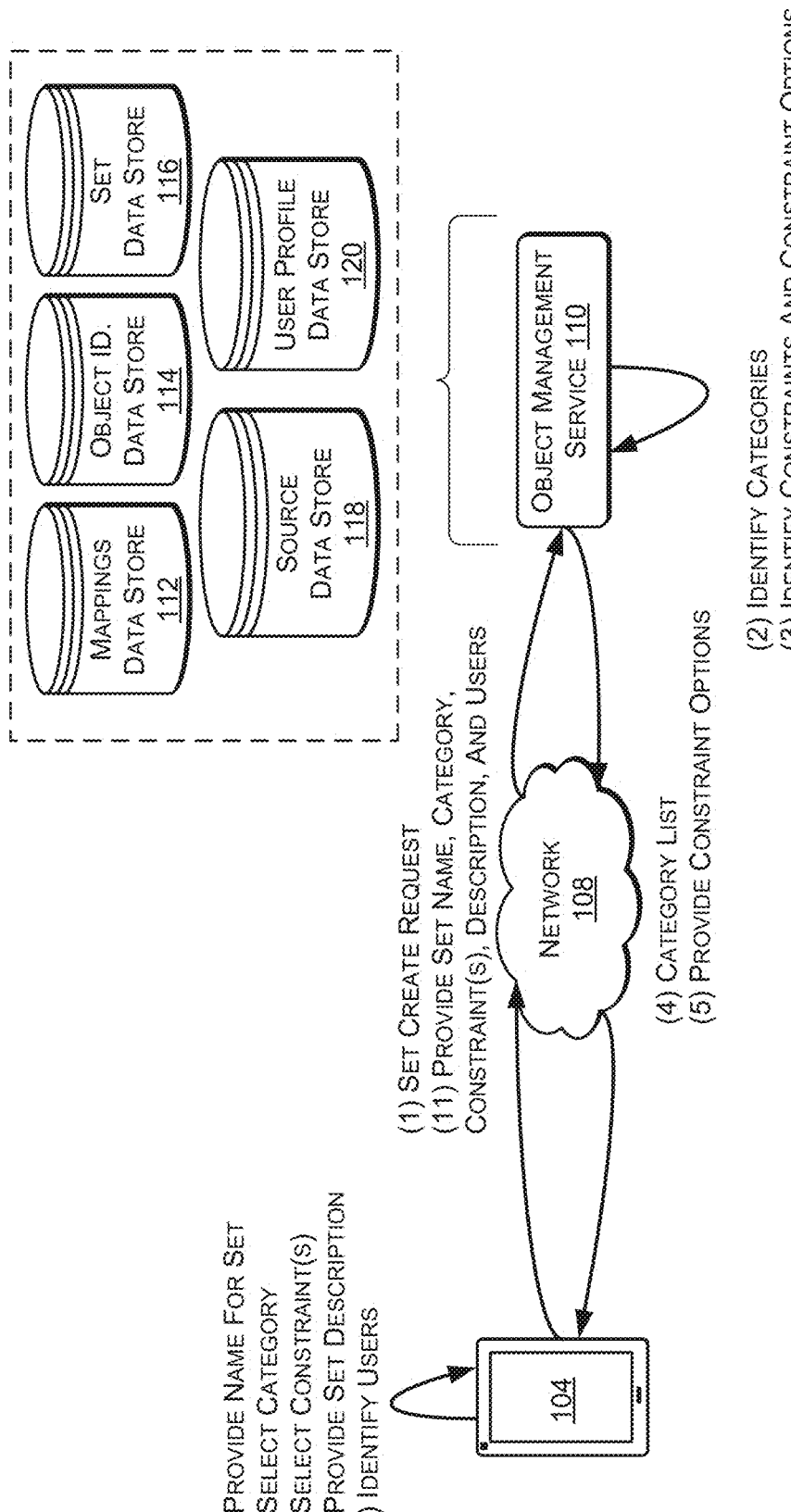
Figure 4:
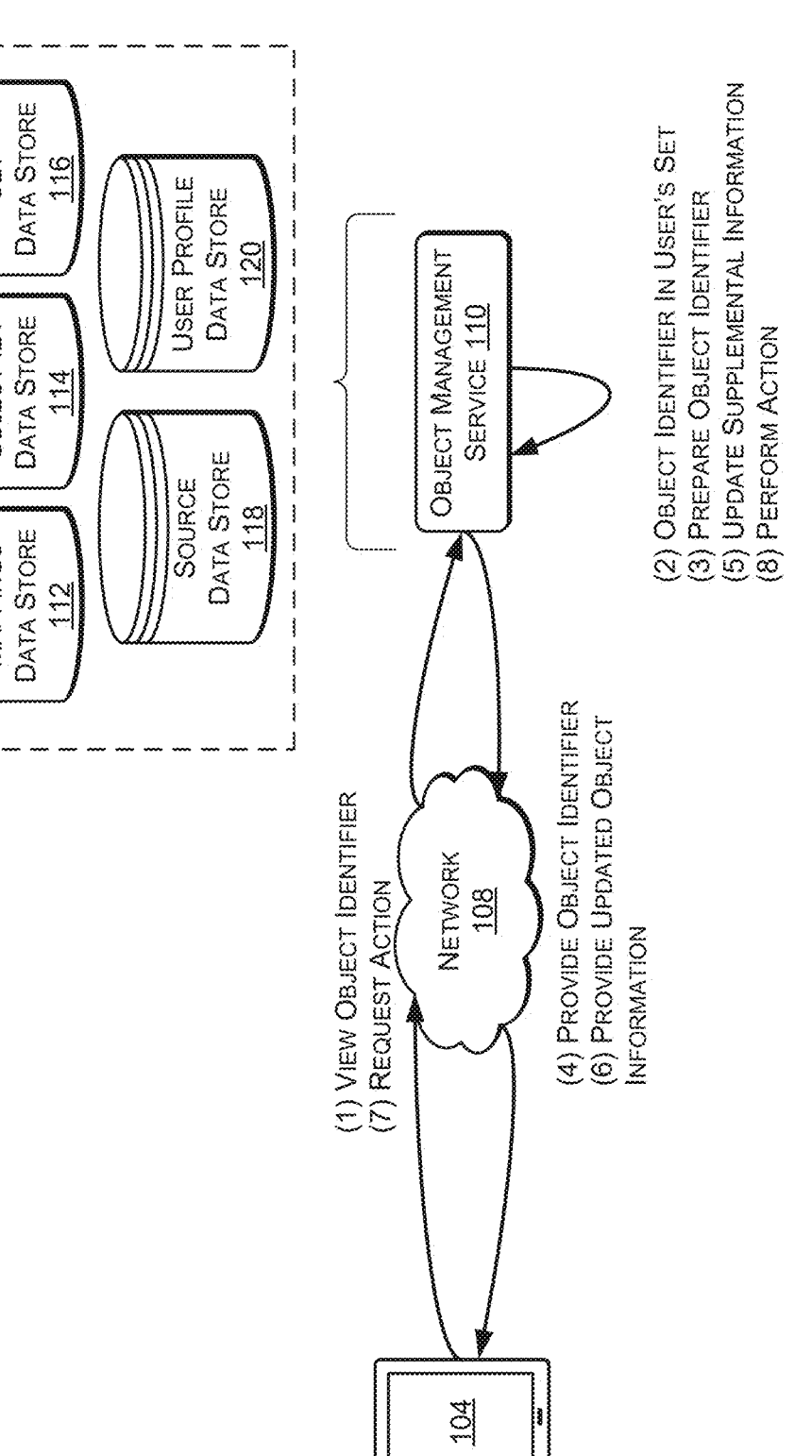

FIGS. 2-4 are block diagrams of example implementations for creating a set, adding object identifiers to the set, and accessing an object identifier, according to an implementation. The example implementation begins with a user accessing a client device 104 and submitting a request to create a set. The request is delivered over the network 108 to the object management service 110 that may then identify categories for selection by the user. In addition, one or more constraints and/or constraint options may be identified by the object management service 110. Constraints or constraint options may include, for example, pre-established settings specified by the user as to how sets are to be created and/or options that may be selected by a user when creating a set. For example, users may specify whether other users viewing object identifiers included in a set may copy those object identifiers, whether other users can add object identifiers to the user's set, view the user's set, etc. Upon identifying categories, constraints and/or constraint options, the object management service 110 may provide back to the client device 104 a category list and an identification of the constraints and/or constraint options for selection by the user.

In an alternative implementation, rather than delivering the request to the object management service, the client device, or program instructions executing on the client device 104 may identify categories for selection by the user as well as any constraints and/or constraint options and provide that information to the user without interacting with the object management service 110.

The user, upon receiving the categories, constraints and/or constraint options from the object management service 110 or directly from the client device 110, may specify a name for the set, select one or more categories that will be used in forming the set, and/or select or modify one or more constraints and/or constraint options for the set. In addition, a user may provide a description for the set and the object identifiers that may be included in the set. For example, if the set is being created to help the user plan for a trip to Hawaii, the user may provide a description identifying "Things I Want to Do in Hawaii Next Spring." In addition, if the user wishes to have other users of the object management service 110 be able to access, view, modify and/or add object identifiers to the set, the user may identify those users thereby allowing the object management service 110 to invite the users to participate in the set.

Once the user has specified the set name, category, constraints, description, and/or users that can access/modify object identifiers associated with the set, that information may be provided to the object management service 110 via the network 108. The object management service 110, upon receiving the information about the set may determine one or more contexts for the set. For example, the object management service 110 may process the set name, category, and description to identify contextual information about the set and discern the user's understanding of the set.

In an alternative implementation, the user may specify the context(s). Upon determining the context for the set, the object management service 110 may create the set and establish a mapping relationship between the set and the user and/or users associated with the set. The identification of the set and the user that created the set may be stored in the set data store 116 and the mappings between the relationships stored in the mappings data store 112.

Turning now to FIG. 3, an example implementation for adding an object identifier to an existing set is described. At an initial point, a user of a client device 104 may initiate a request to add an object. Upon initiating the request, one or more representations for the object may be identified. For example, if the user is viewing a web page and initiates a request to add an object, representations included in the web page may be identified and displayed to the user for selection. A user may then select one or more of the representations for use in creating an object identifier.

In other examples, if the request to add an object relates to a physical object or object that is not represented on a website, the client device 104 may capture or receive a representation for the object for use in adding it to a set. For example, the user may provide or upload a representation of the object. In still other implementations, a user may select a specific representation that is to be used for an object. In this instance, the steps of identifying representations, providing those representations to a user and receiving a selection may be eliminated in place of the user directly identifying the representation that is to be used.

Upon identification of a representation of the object, the client device 104 may provide to the object management service 110 the request to create an object identifier, the selected representation(s), or an identifier thereof (e.g., a URL for the representation), and an identification of the user and/or the client device 104. The object management service 110, in response, may identify the existing sets that have been created by the user and/or are otherwise associated with the user and provide a list of existing sets associated with the user back to the client device 104. The user, via the client device 104, may provide a description for the object and select a set with which the object is to be associated or create a new set with which the object is to be associated. The set and optionally the description provided by the user are returned to the object management service 110.

Based on the representation of the object, the description, and the selected set into which the object is to be associated, the object management service 110 may process the information to determine a context for the object. For example, if the user is adding a representation of the Eiffel Tower (object) into an existing set titled Great Architectural Feats, the object management service 110 may process that information and determine that the context(s) for the object is architecture, engineering, structural design, etc. In other implementations, the user may specify or otherwise provide the context(s) for the object.

Once the context(s) has been determined or provided, the object management service 110 may obtain additional information relevant to the object that corresponds with the context. For example, supplemental information may be provided by external sources that, if relevant to the context, may be associated with and included in the created object identifier. To illustrate, the owner of the Empire State Building may provide supplemental information in the form of structural information, date built, location, height, etc. that is relevant to the context of architecture or engineering. In comparison, the owner of the Empire State Building may also provide supplemental information about the tenants within the building, the restaurants available in the building, etc. However, such supplemental information is not relevant to the context of engineering and may not be retrieved by the object management service 110.

Once the context and any supplemental information have been determined by the object management service 110, an object identifier that includes the representation of the object, the description provided by the user, the determined context, and any supplemental information is created by the object management service 110 and stored in the object identifier data store 114. In addition, mappings may be created between the object identifier, the set into which the object identifier is associated, the user that created the object identifier, the source of the representation included in the object identifier, and optionally a link to a parent object identifier if the representation came from another existing object identifier. The mappings may be stored in the mappings data store 112.

Turning now to FIG. 4, a block diagram of an example implementation for accessing an existing object identifier is described. As illustrated in FIG. 4, a user of a client device 104 may submit a request to the object management service 110 via the network 108 to view an object identifier. Upon receiving a request to view an object identifier, the object management service 110 may determine whether the object identifier is included in a set associated with the user submitting the request. The object management service 110 may also prepare the object identifier by updating any supplemental object information and adding appropriate object information based on the context of the user submitting the request to view the object identifier. Continuing with the Empire State Building example, if the user submitting the view request has a different context (e.g., they are creating a set for places to visit in New York) different supplemental information may be added to the object identifier.

Once the object identifier has been prepared, the object management service 110 may provide the updated object identifier to the client device 104 for viewing by the user. In some implementations, depending on the capabilities and/or connectivity of the client device 104, different forms of the object identifier may be provided. For example, if the client device has limited processing capabilities, limited display space and/or poor connectivity, the object management service 110 may provide an object identifier with reduced information (e.g., only the representation of the object). In comparison, if the client device 104 has higher processing capabilities, additional display space, etc., additional information may be provided as part of the object identifier to the client device 104 for display.

The object management service 110 may also determine if any supplemental information associated with the provided object identifier should be updated. For example, external sources may periodically update supplemental information that is included in an object identifier. If such supplemental information is included in the object identifier, the object management service 110 may query the external source and request the updated information. In another implementation, external sources may periodically provide updates to the object management service 110 that are automatically incorporated into and associated with the corresponding object identifiers. Once the updated supplemental information is obtained, the provided object identifier may be updated as well.

Figure 5:
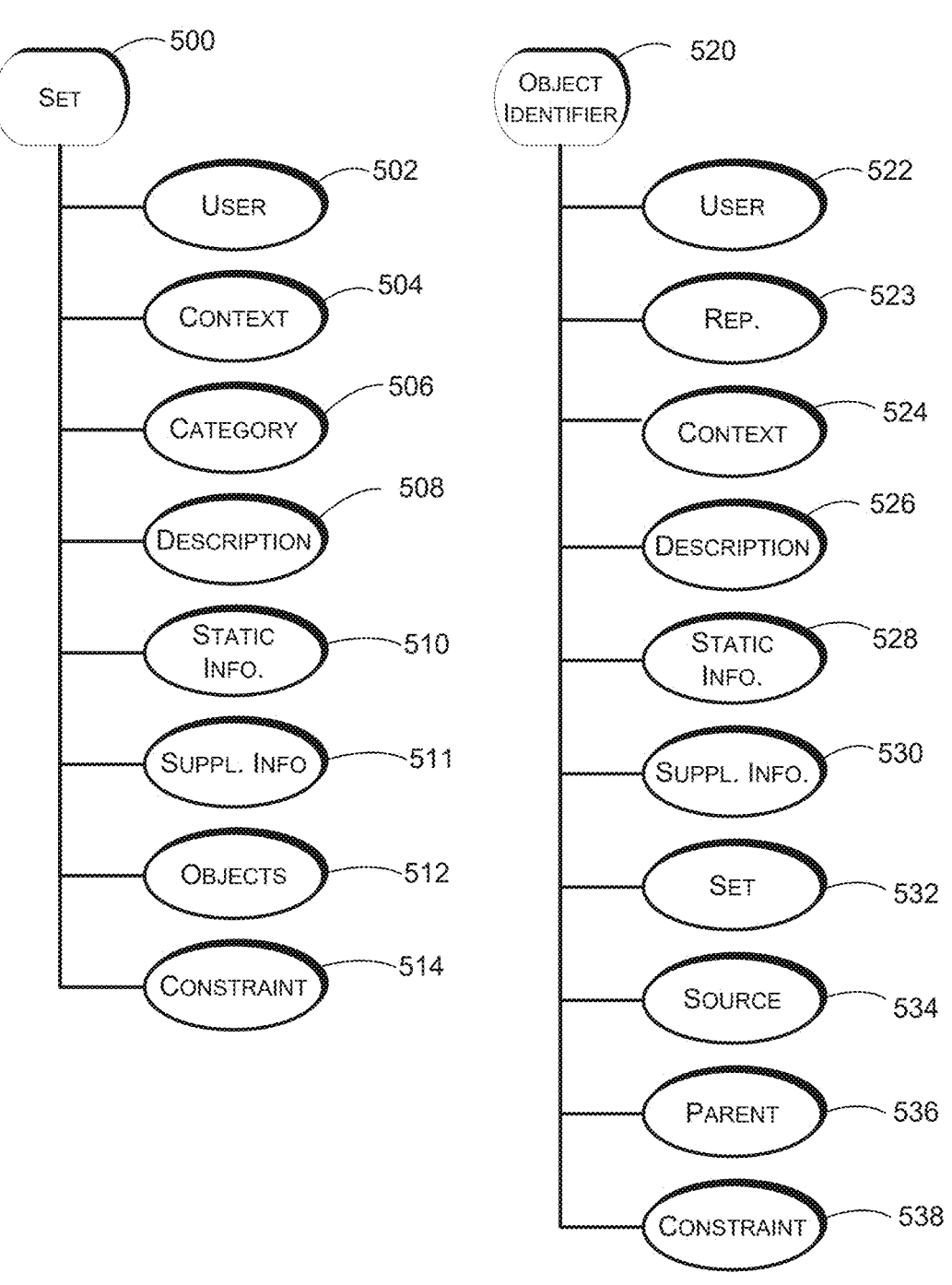
FIG. 5 is a block diagram of an example structure of a set and an object identifier, according to an implementation.

FIG. 5 is a block diagram of an example structure of a set 500 and an object identifier 520, according to an implementation. As discussed above, a set 500 may include an identification of the user 502 that created the set and any users that have been identified as allowed to add object identifiers to the set. In addition, a context 504 as provided by a user or determined by the object management service 110, may be associated with the set 500 along with a user selected category 506. A category 506 may be selected from a list of preexisting categories provided by the object management service 110. For example, a category 506 may be animals, books, arts and entertainment, sports, food and drink, etc. and a user, upon creating a set 500, may select one or more of those categories for association with the set 500. A user may also provide a description 508 providing information about the set 500 from the user's perspective. Static information 510 may also be associated with the set 500. For example, the object management service 110 may automatically incorporate certain information relevant to a set 500 based on the selected category and optionally the provided description 508. Static information 510 may also include information provided by the creator of the set and/or other users of the object management service 110. For example, other users may view, comment and/or otherwise provide feedback with respect to a set. Comments and/or other feedback from the creator and/or other users may be associated with the set 500 and maintained as static information 510.

Supplemental information 511 relevant to the set 500 may also be maintained. Supplemental information for a set may be any form of information or action provided by a source of one or more representations associated with the set, a source of one or more objects associated with a set, or any other external source. For example, if the set is about Hawaii, a weather service (external source) may provide supplemental information in the form of weather in Hawaii that is associated with the set. As object identifiers are added to the set 500, they may be identified as objects 512 associated with the set 500.

Finally, constraints 514 may also be associated with the set 500 and used to control access, modification or other aspects of the set 500. For example, the creator of a set 500 may specify constraints as to who can view the set, add object identifiers to the set, whether users can comment on the set, etc.

In some implementations, an object identifier 520 may include an identification of the user 522 that created the object identifier 520, a user provided description 526 describing the object identifier from the user's perspective, and static information 528. Similar to the set 500, the static information 528 may be included in the object identifier 520 by the object management service 110 based on the selected representation 523 of the object and/or the description provided by the user. For example, if a user has selected a representation 523 of the object that is already known to the object management service, existing information about the representation may be included in the object identifier 520. Other static information about an object identifier 520 may include comments provided by other users of the object management service 110, the creator of the object identifier, etc.

A representation 523 may also be included in the object identifier. The representation may be any element that can be used to represent the object. For example, the representation may be a graphical representation of the object, an audio representation of an object, or any other representation of an object.

In addition to the object management service 110 providing static information 528, in some implementations, supplemental information 530 may also be associated with the object identifier 520. Supplemental information may be any form of information or action provided by a source of the representation, a source of the object, or any other external source. For example, the source of the object may provide information about the object while other external sources may provide actions relevant to the object. For example, if the object is a television, the source of the television may be the manufacturer, such as Sony, and that source may provide basic information about the object. In this example, the information about the object provided by the manufacturer may include the dimensions, resolution, weight, etc. Other external sources, such as sellers of the television, may provide additional supplemental information that may be associated with the object identifier 520. For example, sellers of the object may provide actions that allow a user viewing the object identifier 520 to initiate a purchase of the object, obtain additional information about the object, obtain information about the external source selling the object, etc.

Returning to FIG. 5, the object identifier 520 may also identify a source 534 from which the representation of the object was obtained, or the source of the object. In addition to providing a source 534, if the object identifier was based upon and created from another existing object identifier, that existing object identifier may be identified in the object identifier 520 as the parent 536 of the object identifier 520. Finally, constraints 538 may also be associated with the object identifier 520 and used to control access, modification or other aspects of the object identifier 520. For example, the creator of an object identifier 520 may specify constraints as to whether the object identifier can be viewed by other users, copied into other sets, whether users can comment on the object identifier, etc.

Figure 6:
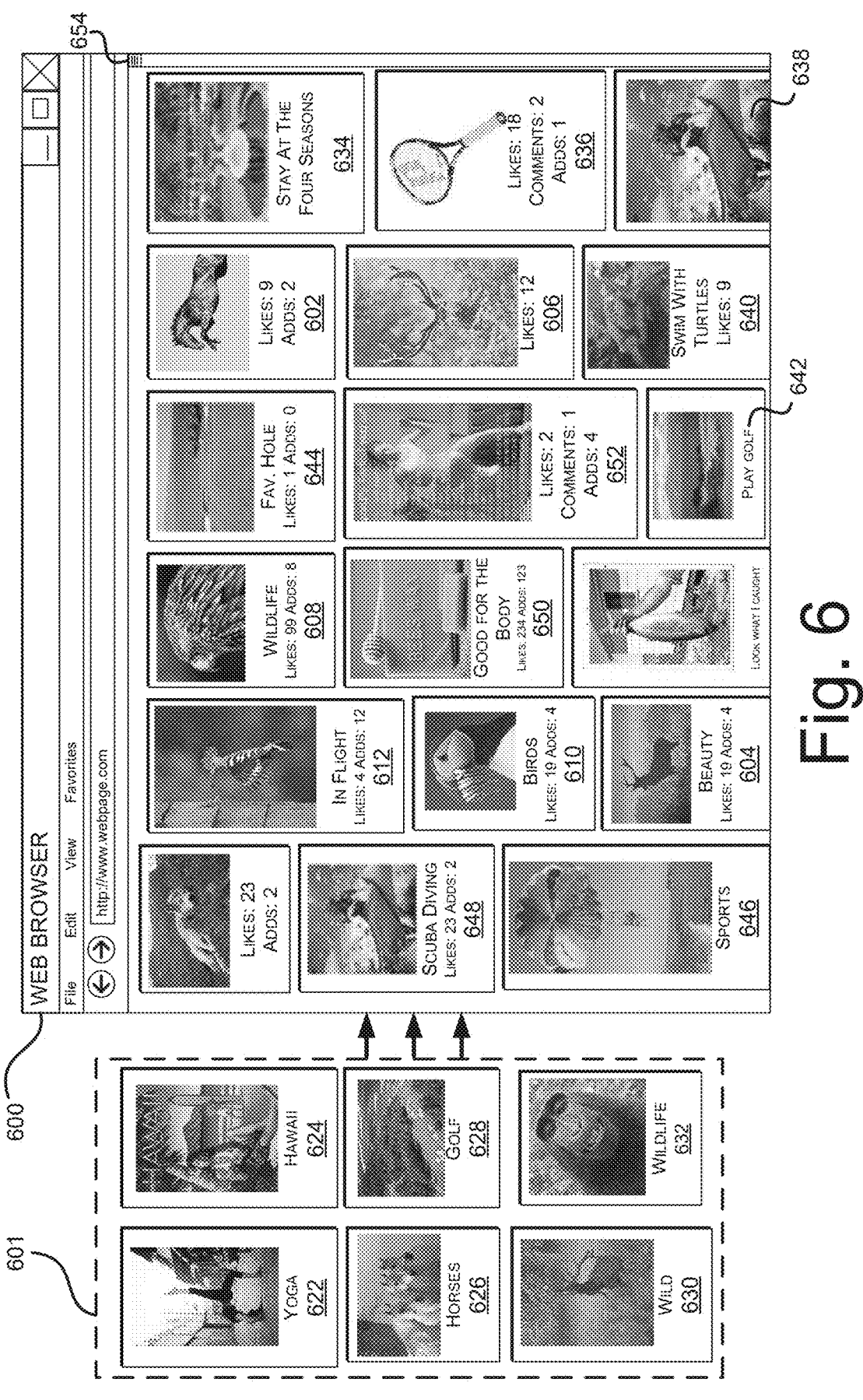
FIG. 6 is a block diagram of an example user interface for viewing object identifiers, according to an implementation.

FIG. 6 is a block diagram of an example user interface 600 for viewing object identifiers, according to an implementation. A user interacting with the object management service 110 may view existing object identifiers, regardless of whether the user created the object identifier or if it was created by another user. In some implementations, without input from the user, random object identifiers may be provided for display to the user. In other implementations, when a user first accesses or joins the object management service 110 they may be provided a group of object identifiers and/or representations of objects and asked to select one or more object identifiers and/or representations of objects that they like or in which they are otherwise interested. Based on the user's selection(s), object identifiers may be identified that are similar or related to those selected by the user and provided to the user. An object identifier may be considered similar to other object identifiers or other representations of objects based on how other users have organized, characterized and/or described the object identifiers and/or representations of objects, based on characteristics of the object identifiers themselves (e.g., color), and/or based on other information. For example, object identifiers may be considered similar and a similarity relationship established if other users have added those object identifiers to the same set, if the contexts of the object identifiers are similar or the same, if the location of the represented objects are similar, etc. This similarity relationship is in contrast to how existing search systems operate, which provide search results based on keywords about the object itself.

Returning to FIG. 6, the graphical user interface 600 of object identifiers includes object identifiers that the object management service 110 identified as similar to a group of object identifiers 601 initially selected by a user (not shown). In this example, the user was initially provided a group of object identifiers and the user selected the six object identifiers 622, 624, 626, 628, 630, 632 included in the group of object identifiers 601 as being of interest. Based on the context, description and/or sets with which the selected object identifiers 622-632 are associated, similar object identifiers are selected and presented to the user via the graphical user interface 600.

In this example, the selected object identifiers have contexts of wildlife, horses, travel, outdoor activities, outdoors, health, golf, Hawaii, and scuba diving. Likewise, each of the selected object identifiers 622-632 are associated with one or more sets that include other object identifiers. Based on the context, associated sets, description and other information associated with the selected object identifiers 622-632 and associated sets, the object management service 110 identifies and provides the object identifiers included in the graphical user interface 600. These object identifiers were determined by the object management service 110 to be similar to those initially selected by the user, based on how other users have organized and/or categorized the object identifiers and/or based on the contexts of the object identifiers. For example, the object identifiers 602, 604, 606, 608, 610, 612 all have a context relating to wildlife, outdoors and/or animals. Likewise, the object identifiers 634, 636, 638, 640, 642, 644, 646, 648 are all related to Hawaii, outdoor activities and/or outdoors. Finally, the object identifiers 650, 652 were identified as similar to some of the object identifiers initially selected by the user as they have a context of health. In this example, the selected object identifier 622 and the presented object identifier 652 were also determined similar because several other user has placed the representations associated with those object identifiers into the same set.

In addition to the object identifiers presented on the GUI 600, a user may view additional object identifiers identified as similar to the group of initially selected object identifiers 601 by scrolling down the graphical user interface, for example by using the scroll bar 654.

As a user continues to interact with the object management service 110, viewing object identifiers, liking existing object identifiers, commenting on object identifiers, adding object identifiers to sets associated with the user, etc., the group of object identifiers 601 may be automatically updated based on how the user is interacting with the object management service 110. For example, if the user continues to explore, view and comment on object identifiers related to Hawaii, the group of object identifiers 601 may be updated to include those object identifiers. As a result, the object identifiers selected and presented to the user via the graphical user interface 600 may be adjusted to reflect what the user is currently exploring. In some implementations, the group of object identifiers 601 may continue to expand including a history of object identifiers selected, viewed, added to sets, commented on, or with which the user has otherwise interacted. In other implementations, the number of object identifiers included in the group of object identifiers may remain constant with new object identifiers replacing older ones.

As a user interacts with the object identifiers, they may select an object identifier and associate that object identifier with a set. As discussed below, if one or more sets are already associated with the user, the user may add a selected object identifier to one of those sets. If there are no sets associated with the user, the user may create an object identifier, as illustrated in FIG. 7.

Figure 7:
FIG. 7 is a block diagram of an example user interface for creating a set, according to an implementation.

FIG. 7 is a block diagram of an example user interface 700 for creating a set, according to an implementation. As illustrated in the example user interface 700 a user interacting with the object management service 110 may submit a request to create a set and be provided with the user interface 700. Through the user interface 700 a user may specify a name 702 for the set, such as "Trip to Maui, Hawaii." In addition to providing a name 702 for the set, a user may select one or more object categories 704 by interacting with the category list control 706 that provides a list of the different categories that may be associated with a set. In this example, the creator 712, Sam Snead, has selected the object category 704 of travel because the set is being created in preparation for his trip to Maui, Hawaii as identified by the set name 702.

In addition to specifying a category, a user may provide a description 708 as to the purpose or other information about the set from the perspective of the user creating the set. In some implementations, the description 708 may provide information to the user or other individuals viewing the set or object identifiers within the set. The description 708 may also be used by the object management service 110 as a factor for determining a context for the set. The user 712 may also be able to specify whether any other users can add object identifiers to the set by including an identification of those users in the Who Can Add control 710. For example, if other users of the object management service 110 are to have the ability to add object identifiers to the created set, the creator 712 of the set may identify those users by their user name, e-mail address, or other identifier and the object management service 110 may associate those users with the set and invite those users to access the set. Finally, once a user has specified all the information for the set, the user may provide a request to the object management service 110 to create the set through selection of the create set control 714.

Figure 8:
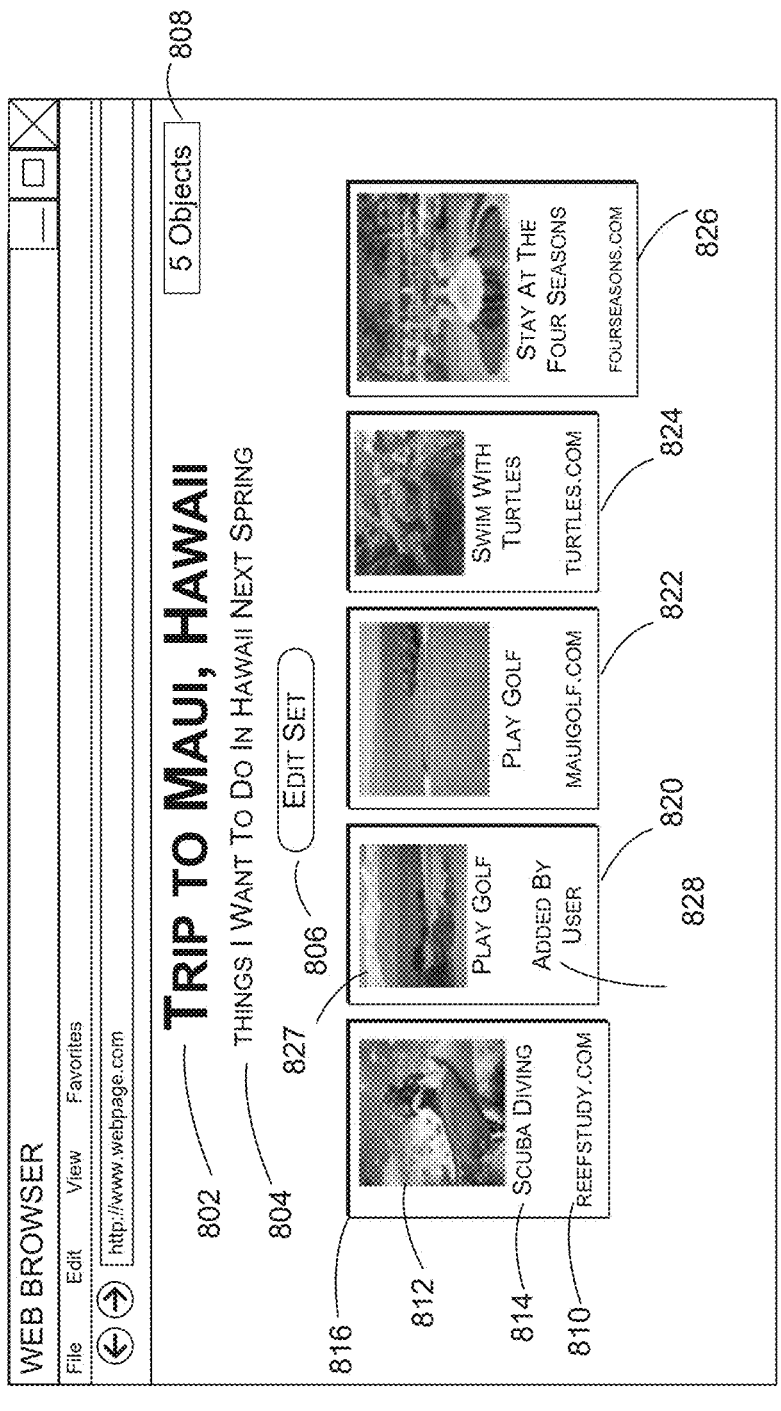
FIG. 8 is a block diagram of an example user interface identifying a set that includes multiple object identifiers, according to an implementation.

FIG. 8 is a block diagram of an example user interface 800 identifying a set that includes multiple object identifiers, according to an implementation. The user interface 800 illustrated in FIG. 8 includes the name of the set 802 provided by the user when creating the set along with the description 804 for the set. In addition, in this example, the user has associated five object identifiers 816, 820, 822, 824, 826 with the set, as illustrated by the object identifier count 808. As described herein, each object identifier 816, 820, 822, 824, 826 may include a representation of the object, a description of the object, and a source of the object and/or a source of the representation of the object. For example, the object identifier 816 includes a representation 812 of the object scuba diving. In addition, the user has provided a description 814 "scuba diving" that is included with the object identifier 816. The object management service 110 has also included an identification of the source 810 of the representation 812. In this example, the source 810 is "reefstudy.com." As will be appreciated, the source of an object and/or the source of the representation of the object may, come from any entity or location, such as reefstudy.com, or be provided by a user. To illustrate, the representation 827 associated with the object identifier 820 was added by the user, as shown by the statement "added by user" 828. A user may add or remove object identifiers from the set 800 or interact with any of the object identifiers 816, 820, 822, 824, 826 to obtain additional information about those object identifiers. Likewise, the user may modify characteristics of the set by selecting the edit set control 806.

Sets may be displayed in a variety of manners depending upon, for example, the context of the user viewing the set, the category and/or context of the set, the object identifiers associated with the set, the capabilities of the client device upon which the set will be displayed, etc. For example, if the set includes object identifiers having different colors (e.g., clothing), the object identifiers associated with the set may be organized and displayed according to color. In other examples, if the object identifiers of the set are associated with geographic locations, or if the context of the set corresponds with a geographic location, the set may be displayed as a map and each object identifier presented at the corresponding geographic location. In such an example, a user can interact with the set and traverse the different geographic locations to view the various object identifiers. It will be appreciated that object identifiers of a set can be organized and presented in a multitude of different ways and the ones presented herein are provided only as examples. Likewise, object identifiers may also be organized in pre-sented in a variety of ways independent sets. Still further, sets may likewise be organized and presented in a multitude of different ways for viewing by users.

Figure 9A:
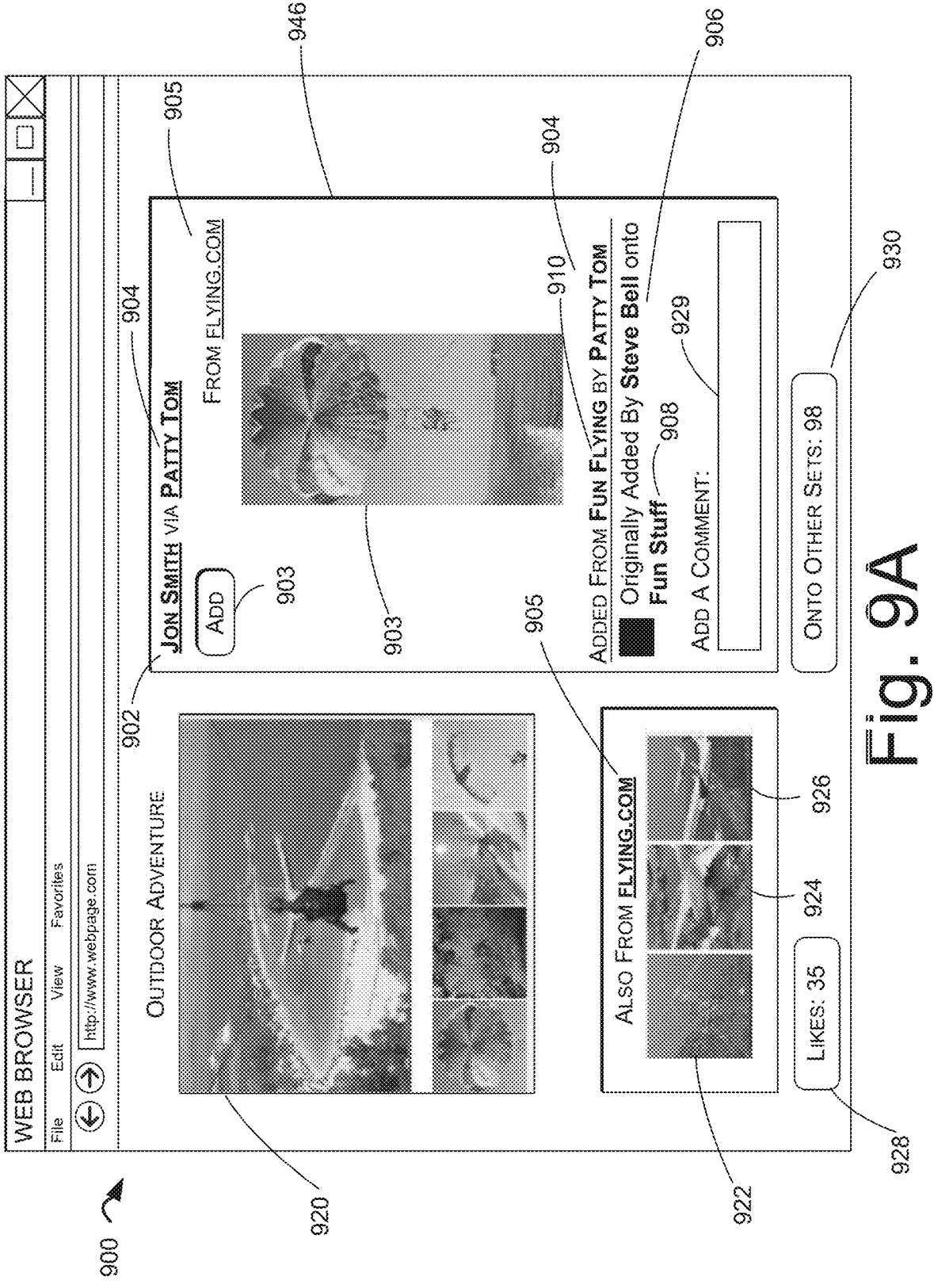
FIGS. 9A and 9B are block diagrams of an example user interface identifying an object identifier, according to an implementation.

Turning briefly back to FIG. 6, a user may interact with any of the object identifiers provided on the graphical user interface 600. In interacting with an object identifier, a user may obtain additional information about the object identifier or perform any actions associated with the object identifier. For example, turning to FIG. 9A, a block diagram of an example user interface 900 identifying additional details about the object identifier 646 (FIG. 6), according to an implementation, is provided. As illustrated in the user inter-face 900, the user has selected the object identifier 646 (FIG. 6) and requested to obtain additional information about the object identifier 646. In this example, the user interface 900 provides additional information associated with the object identifier 946. The additional information for the object identifier 946 includes the representation 903 associated with the object identifier 946, an identification of the creator 902 of the object identifier "John Smith," and an identifi-cation of the user 904 "Patty Tom" from which the repre-sentation 903 was obtained by the creator John Smith 902 when creating the object identifier 946. A source 905 may also be identified in the object identifier 946 along with an identification of the original user 906 that originally added the representation 903. In this example, the original user 906, "Steve Bell," originally added the representation 903 onto the set "Fun Stuff" 908. The object identifier 946 may also include an identification of the set 910 "Fun Flying" from which the representation 903 was obtained and identify the user 904 "Patty Tom" that created the parent object identifier.

In addition to providing additional information about the object represented by the object identifier 946, the user interface 900 may also provide a higher level overview of the set with which the object identifier 946 is associated. For example, the overview images 920 may represent a collage of the object identifiers associated with the set that includes the object identifier 946. In addition, other information, such as object identifiers from the parent set, or the source 905 may also be identified in the user interface 900. For example, the source "flying.com" 905 may also include other object identifiers, such as those illustrated by representations 922, 924, 926.

The user interface 900 may also identify other users of the object management service 110 that have indicated whether they like or dislike the object identifier 946 or commented on the object identifier. For example, the Likes counter 928 identifies that 35 other users have identified that they like the object identifier 946. Users may also provide comments to the object identifier using the comment control 929. Like-wise, the Onto Other Sets counter 930 identifies that the object identifier 946 and/or the representation 903 has been added to 98 other sets that are managed by the object management service 110.

Figure 9B:
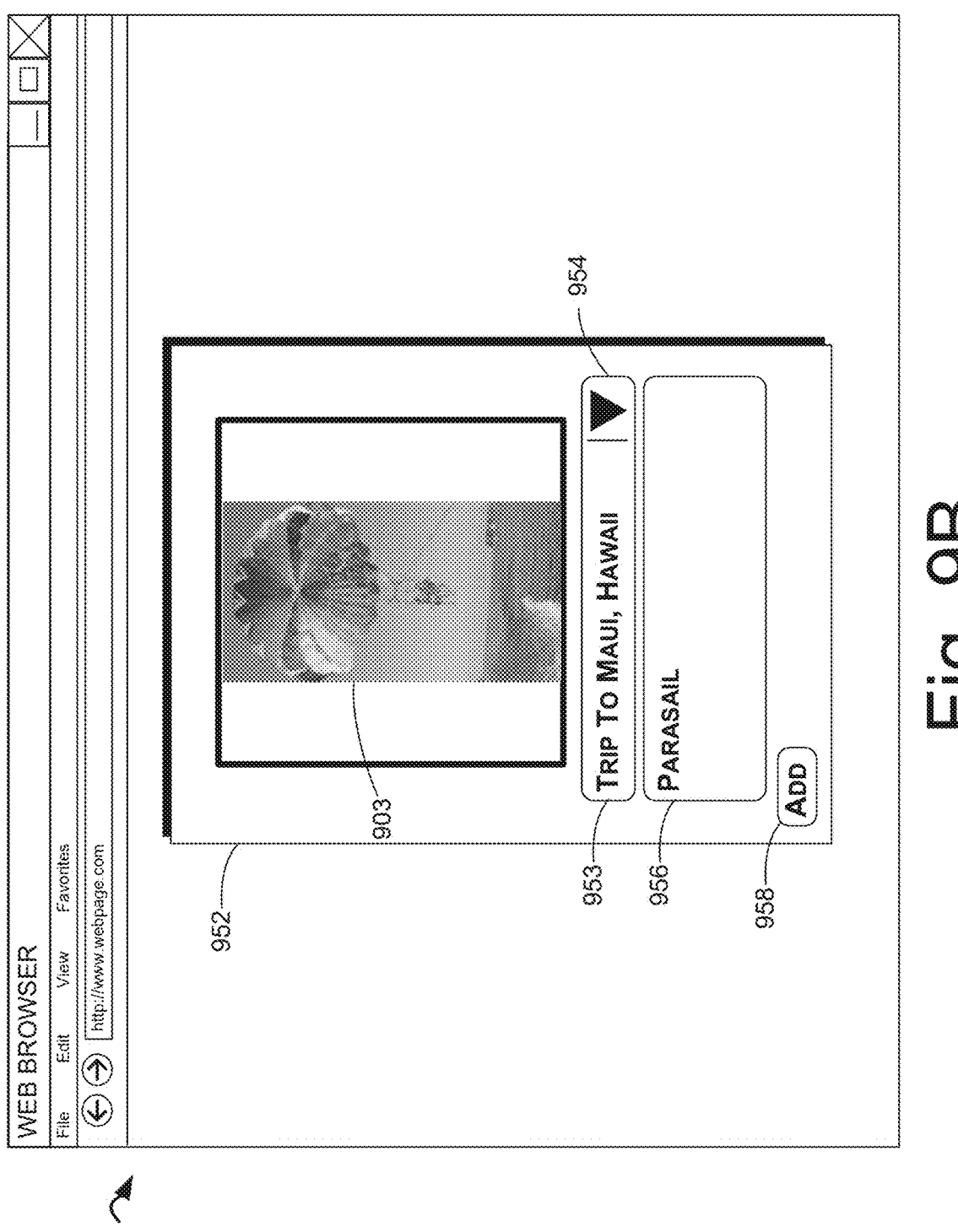

A user viewing the user interface 900 may also select to add the object identifier to another set through selection of the add control 903. Upon selecting the add control, the user is provided a new object identifier 952, as illustrated by the graphical user interface 950, illustrated in FIG. 9B. For example, if the user selects to add the existing object identifier 946 (FIG. 9A) to a set, the user is provided a new object identifier 952 (FIG. 9B). The new object identifier 952 may assume or inherit some of the information associ-ated with the existing object identifier 946 and/or allow the user to add or modify information. For example, the new object identifier 952 may include the representation 903 and description 956 that are associated with the existing object identifier 946. The user can modify, replace and/or add to the description 956 to personalize the object identifier based on the meaning (context) as understood by the user in selecting the object identifier. For example, rather than adopting the description of "Sports" the user may provide a description that is more informative as to the context for which they selected the object identifier. In this example the user may provide a description of "Parasail."

The new object identifier 952 may also identify a set associated with the user with which the user is most likely to associate the object identifier 952. In this example, the user already has an associated set titled "Trip to Maui, Hawaii" with a description of "Things I want to do in Hawaii Next Spring" (See FIG. 8). Based on the information asso-ciated with the set and the information from the selected object identifier 946, the object management service 110 can anticipate that the user will associate the object identifier 952 with the set Trip To Hawaii. A user may also select a different set, or create a new set, by selecting the list control 954.

Once the user has selected a set and modified the new object identifier 952 based on their own context, they may complete the addition of that new object identifier 952 to the identified set through selection of the add control 956. Upon selecting the add control, the new object identifier 952 is associated with the set, a parent relationship is created and maintained with the existing object identifier 946 and the other information described herein is associated and main-tained with the new object identifier 952, set and/or user. The object identifier 952 may now be identified and presented to other users with a similar context (e.g., Hawaii, outdoors, sports, travel). Also, when the user views the set "Trip to Maui, Hawaii," the object identifier 952 will be displayed along with the other object identifiers associated with that set.

Figure 10:
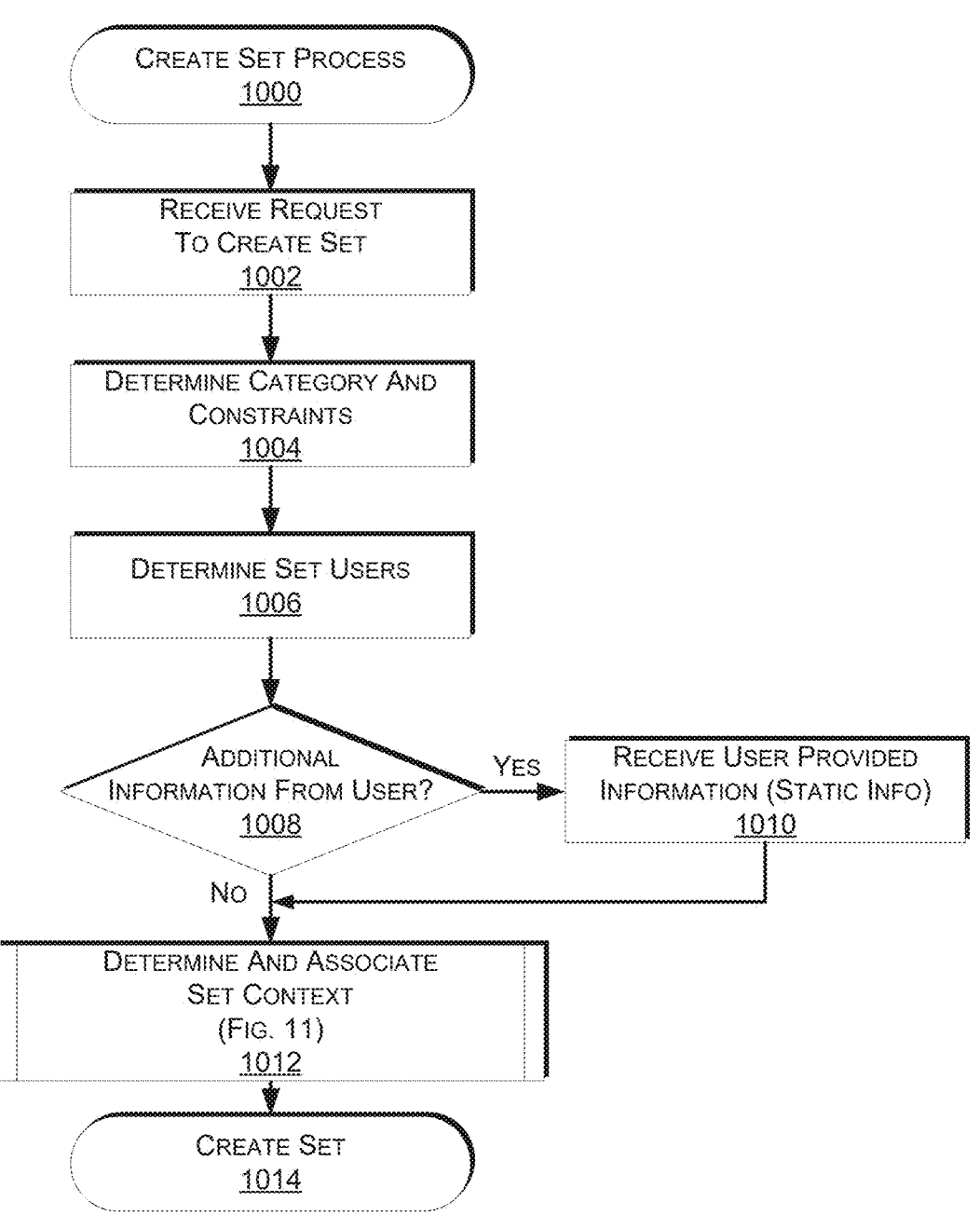
FIG. 10 illustrates an example process for creating a set, according to an implementation.

FIG. 10 illustrates an example process 1000 for creating a set, according to an implementation. The example process 1000 and each of the other processes described herein are illustrated as a collection of blocks in a logical flow graph. Some of the blocks represent operations that can be imple-mented in hardware, software, or a combination thereof. In the context of software, the blocks represent computer-executable instructions stored on one or more computer-readable media that, when executed by one or more proces-sors, perform the recited operations. Generally, computer-executable instructions include routines, programs, objects, components, data structures, and the like that perform par-ticular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 1000 begins upon receiving a request to create a set with which one or more objects will be associated, as in 1002. Upon receiving a request to create a set, the example process 1000 may determine a category for the set and one or more constraints, as in 1004. In one implementation, a user may specify a category from a list of categories that is to be associated with the set being created at the user's request. In other implementations, a category may be determined based off other information provided by the user, such as the description of the set or an object to be associated with the set.

For example, a user may request to create a set by identifying one or more objects to include in a new set. The example process 1000 may analyze those objects and determine a matching category for use in creating the set. For example, if the representations are images of Hawaii, and the user has specified a title for the set to be "Trip to Maui, Hawaii," the example process 1000 may determine that the category for the set should be travel.

In addition to determining categories, one or more constraints may be specified for the set. For example, constraints may be restrictions identified or previously provided by the user as to how the set is to be managed. For example, a user may specify what type(s) or representations can be used in object identifiers associated with the set, how the object identifiers are arranged within the set, etc.

The example process 1000 may also determine users that are allowed to access or otherwise add object identifiers to the set that is being created, as in 1006. For example, a user may specify whether a set is to be shared publicly, shared with known users, shared only with invited users, or not shared at all.

The example process 1000 may also determine whether additional information has been provided by the user, as in 1008. A user may provide any additional information about the set, such as static information. For example, a user, or the device through which the user is interacting, may provide location information, time, date, etc., that may be associated with the set. If it is determined that the user has provided additional information, the additional information may be received from the user and considered/included in the set, as in 1010. If it is determined that additional information has not been provided from the user, or after receiving additional information from the user, the example process 1000 may determine and associate a set context, as illustrated by sub-process block 1012. The sub-process for determining and associating a set context with a set that is created by the example process 1000 is described in more detail below with respect to FIG. 11. Upon determining and associating a set context, the example process 1000 creates the set as requested by the user, as in 1014. As discussed above, a set may include a name, an identification of the set creator, an identification of any other users associated with the set context for the set, category, description, static information, etc.

Figure 11:
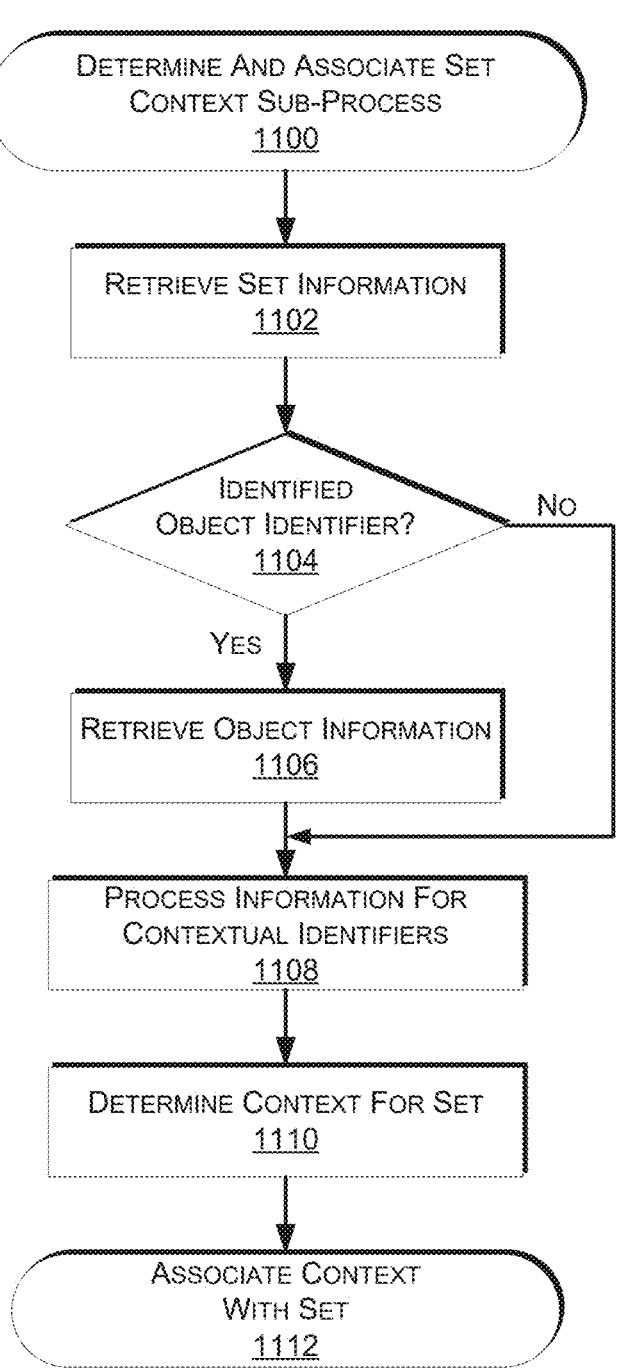
FIG. 11 illustrates an example sub-process for determining and associating set context with a set, according to an implementation.

FIG. 11 illustrates an example sub-process 1100 for determining and associating set context with a set, according to an implementation The example sub-process 1100 may be completed as part of the example process 1000 during set creation. In other implementations, rather than performing the example sub-process 1100, the user may specify the context. In still other implementations, sets may utilize the category as the context.

In one implementation, the example sub-process 1100 retrieves set information, such as a name of the set, a description of the set, and any additional information provided by the user about the set, as in 1102. In addition, a determination may also be made as to whether an object identifier or representation of an object has been identified as part of the set creation process, as in 1104.

If it is determined that an object identifier has been identified, the example sub-process 1100 retrieves any information associated with the object identifier, as in 1106. For example, a user may specify an object identifier that is already known to the object management service 110 and for which information is already associated. Such information may be obtained, as in 1106, and used by the example sub-process 1100 as a factor for determining a context that will be associated with the set. For example, if a user does not have an existing set and selects to create an object identifier based on an existing object identifier, the object management service 110 may consider information about the set in which the existing object identifier is associated, as well as context for the existing object identifier, and utilize that information in determining a context for the set.

To further illustrate, in addition to determining context, the object management service 110 may consider the category of the set with which the existing object identifier is associated and identify one or more titles that may be used in creating a set for the user.

After retrieving any related information, or if it is determined that an object identifier has not been identified, the example sub-process 1100 processes the collected information for contextual identifiers. For example, the example sub-process 1100 may process the name of the set, descriptive information provided by the user for the set, a category specified for the set, and any information about object identifiers and/or corresponding sets that have been identified. Processing may include a linguistic analysis of the information to identify words or phrases that the example sub-process 1100 can use to identify and determine a context as understood by the user, as in 1110. Other techniques may be used in addition to, or as an alternative to linguistic analysis to determine a context as understood by the user. Upon determining a context for the set, the example sub-process 1100 associates the context with the set, as in 1112.

Figure 12:
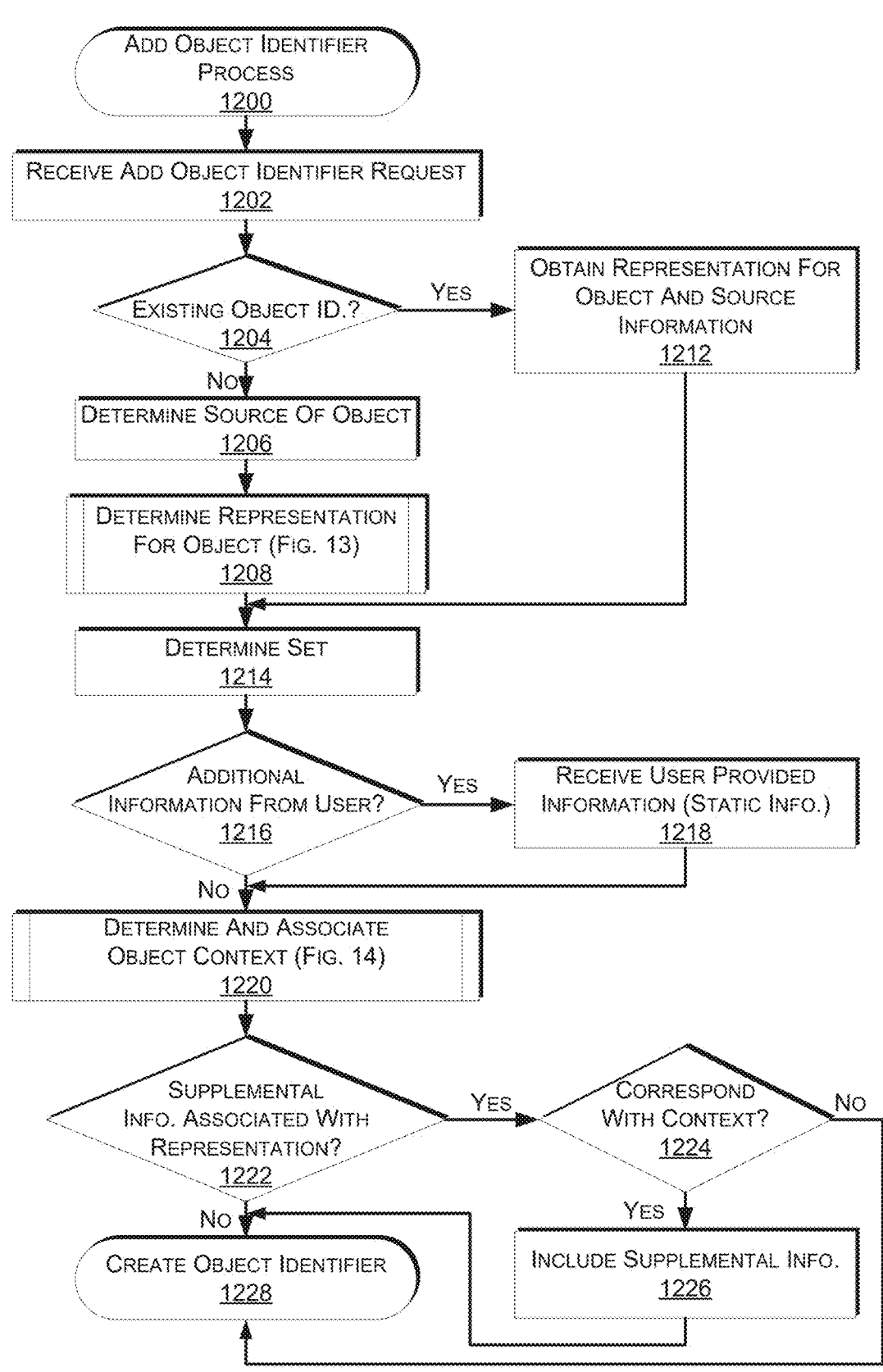
FIG. 12 illustrates another example process for adding an object to a set, according to an implementation.

FIG. 12 illustrates an example process 1200 for adding an object identifier to a set, according to an implementation. The example process 1200 begins upon receiving a request to add an object identifier to one or more existing sets, as in 1202. Upon receiving a request to add an object identifier, the example process 1200 may determine if an object identifier already exists in the object identifier data store 114, as in 1204. For example, if a user is requesting to add an object identifier by selecting an existing object identifier, it may be determined that an object identifier already exists.

Upon identifying an existing object identifier, the example process 1200 obtains the representation for the object and source information identifying the source of the object and/or the source of the representation for the object from the existing object identifier, as in 1212.

However, if it is determined that an object identifier does not exist (the user is requesting to create a new object identifier), a source of the object is determined, as in 1206. A source of the object may be a provider of the object, a provider of the representation of the object, a location of the object, or any other origination point for an object. Upon determining the source of the object, a representation for the object is determined, as in 1208. The sub-process for determining a representation for an object is described in further detail below with respect to FIG. 13.

Continuing with the example process 1200, a set for which the object identifier is to be associated is determined, as in 1214. In one implementation, a set for the object identifier may be identified by the user that has submitted the request to add an object identifier. In other implementations, the set for which the object identifier is to be associated may be determined based on contextual information provided by the user. For example, if the user is watching a television show and selects to represent the television show as an object, or a portion of the television show as an object, the user may have already specified that any object identifier representing a television show is to be put in a set titled as "Television Shows."

In addition to determining a set for the object identifier, a determination is made as to whether the user has provided any additional information for the object identifier, as in 1216. A user may provide any additional information (e.g., static information) about the object, such as static information. For example, a user, or the device through with the user is interacting, may provide location information, time, date, etc., that may be associated with the object identifier. If it is determined that additional information for the object is provided by the user such information may be received by the example process 1200 and associated with the object identifier that will be created, as in 1218. Upon receiving the user provided information, or if it is determined that no additional user provided information exists, the example process 1200 may determine and associate object context information with the object identifier, as in 1220. The sub-process for determining and associating object context information is described in further detail below with respect to FIG. 14. In other implementations, rather than performing the example sub-process described with respect to FIG. 14, the user may specify the context.

After determining and associating object context information, the example process 1200 may determine whether supplemental information associated with the representation exists, as in 1222. If it is determined that supplemental information is associated with the representation of the object, a determination is made as to whether the supplemental information corresponds with the context determined for the object identifier, as in 1224. For example, an external source may provide supplemental information for an object, some of which may correspond with the context identified for the object identifier and some of which may not. For example, if the user has requested to create an object identifier for a Ford pickup truck, and it is determined that the context for the object identifier is "new car," the example process 1200 may process the supplemental information associated with the representation identified for the Ford pickup truck and determine which, if any, of the supplemental information is relevant to the context for the object.

In this example, supplemental information from dealers that sell Ford pickup trucks, information about the truck, such as sales price, features, options, etc. may be supplemental information that corresponds with to the context for the object. In comparison, if another user has identified a Ford pickup truck as an object to be identified by an object identifier but has specified the context for the object identifier as "My Old Truck," the example process 1200 may determine the contextual information provided by sellers of the car does not correspond with the context. However, it may also be determined that supplemental information provided from repair shops may be relevant supplemental information to include in the object identifier.

In some implementations, multiple contexts may be associated with an object identifier and accordingly supplementation relevant to each of those objects may also be associated with the object identifier. In such an implementation, when the object identifier is viewed, the object management service 110 may determine the context in which the object identifier is being viewed and provide the supplemental information that relates with that context. For example, if the object identifier is a recipe, the contexts associated with the object identifier may include ingredients and preparation. Supplemental information relevant to each context may be identified and associated with the object identifier. When the object identifier is viewed, the appropriate context may be determined (e.g., context may be ingredients if it is determined that the user is view ng the object identifier while in a store) and the appropriate supplemental information provided.

If it is determined that the supplemental information associated with the representation corresponds with the context as understood by the user, the example process 1200 may include the supplemental information in the object identifier, as in 1226. However, if it is determined that the supplemental information does not correspond with the context, the supplemental information may not be added to the object identifier.

Upon adding the supplemental information that corresponds with the context (1226), if it is determined that the supplemental information does not correspond with the context (1224), or if it is determined that there is no supplemental information associated with the representation of the object (1222), the example process 1200 creates the object identifier, as in 1228. As discussed above, an object identifier may include, among other things, a representation of an object, a context, a source, an identification of similar object identifiers, an identification of the user that created the object, an identification of other users that have added the object identifier to other sets, an identification of a parent object identifier, a source of the object and/or representation, a description, supplemental information, static information, an identification of the set with which the object identifier is associated, etc.

Figure 13:
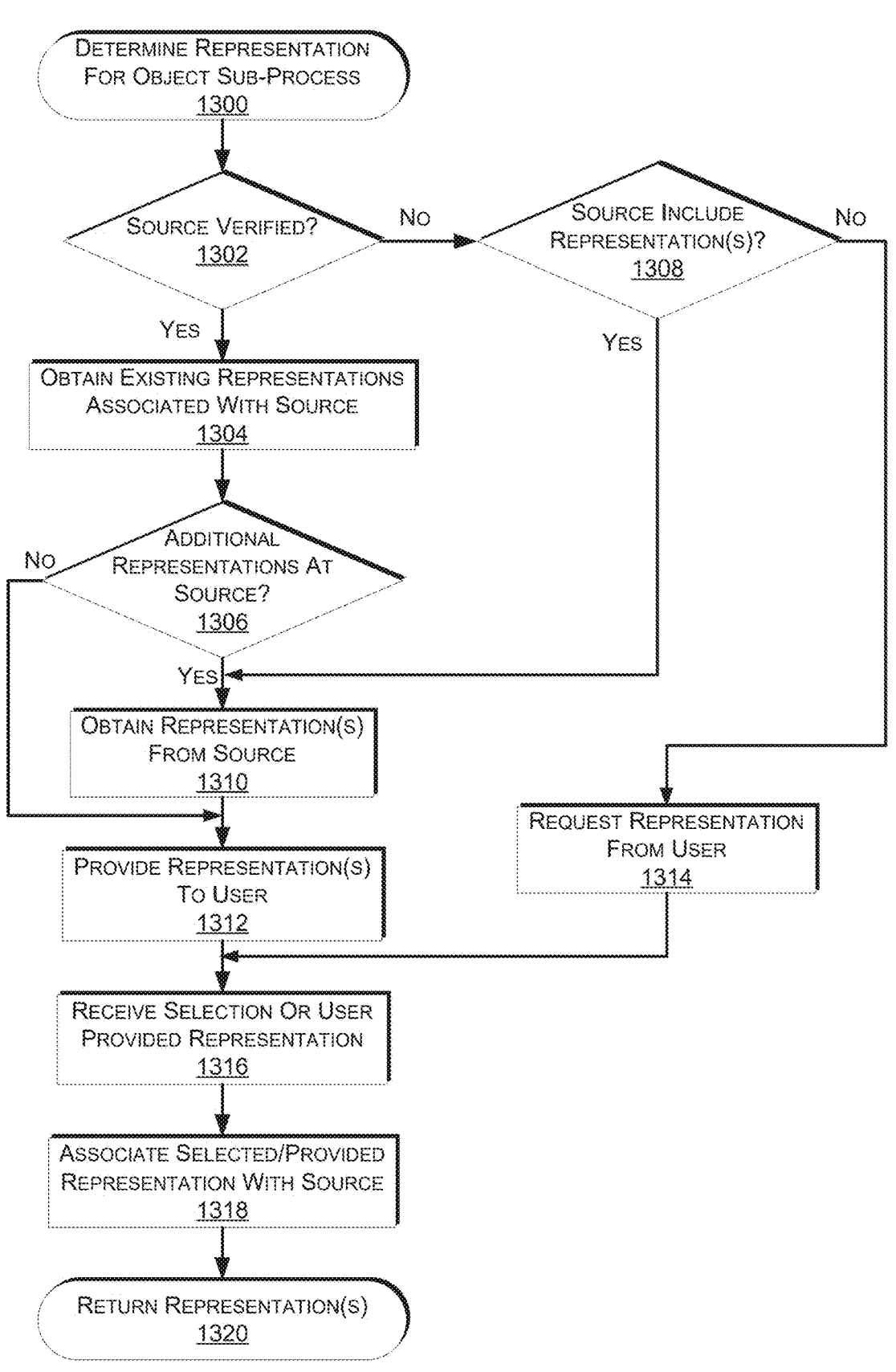
FIG. 13 illustrates an example sub-process for determining a representation for an object, according to an implementation.

FIG. 13 illustrates an example sub-process 1300 for determining a representation for an object, according to an implementation. The example sub-process 1300 for determining a representation for an object initiates by determining whether the source of the object is verified, as in 1302. A source may be verified by the object management service 110 in a variety of manners. For example, if the representation is an image taken from a website, the source which is represented by the website address (URL) may automatically be verified as the source of the representation because the representation is coming directly from the website. In other examples, external sources may identify themselves as the sources for representations, or objects, and upon review by the object management service 110 may become verified sources and associated with those representations/objects.

If it is determined that the source is verified, the example sub-process 1300 obtains existing representations already associated with the source and maintained by the object management service 110, as in 1304. Existing representations associated with the source and maintained by the object management service 110 may be representations for objects that were previously provided by the source when verified, previously obtained representations that have been associated with a source, or any other representations of objects maintained by the object management service 110 and associated with a verified source.

Upon obtaining existing representations associated with a verified source, a determination may be made as to whether additional representations exist at the source that are different than those already obtained, as in 1306.

Returning to decision block 1302, if it is determined that the source is not verified, a determination may be made as to whether the source includes representations, as in 1308. For example, if the unverified source is a website, it may be determined that there are one or more images (representations) available at the source. If there are no representations available from the source (e.g., the source is a physical object, location), the example process may request a representation of the object from the user, as in 1314.

If it is determined that additional representations exist at the verified source (1306) or if it determined that representations are available from an unverified source (1308), those representations may be obtained from the source, as in 1310. In some implementations, the process of obtaining representations from an unverified source may include verifying the source as the provider of the representations. This may include obtaining additional information about the source and storing information about the source in the source data store 118.

Once the representations of the object are obtained, or if it is determined that no additional representations from a verified source exist, the representations are provided to a user for selection, as in 1312. For example, the object management service 110 may send for display on a client device 104 the representations of the object that are managed by the object management service 110 and associated with the verified source, obtained from the verified source and/or obtained from an unverified source.

After providing representations to the user, or after requesting the user provide a representation, the example sub-process 1300 may receive a selection or user provided representation as the representation for the object, as in 1316. In some implementations, a user may either select one of the provided representations or provide their own representation of an object. In other implementations, a user may select multiple representations and/or select a representation as well as provide their own representation(s) for the object. Once the representation(s) have been selected and/or provided by the user, the example sub-process 1300 associates the selected representations with the source, as in 1318, and returns those representations to the example process 1200 (FIG. 12), as illustrated in 1320.

Figure 14:
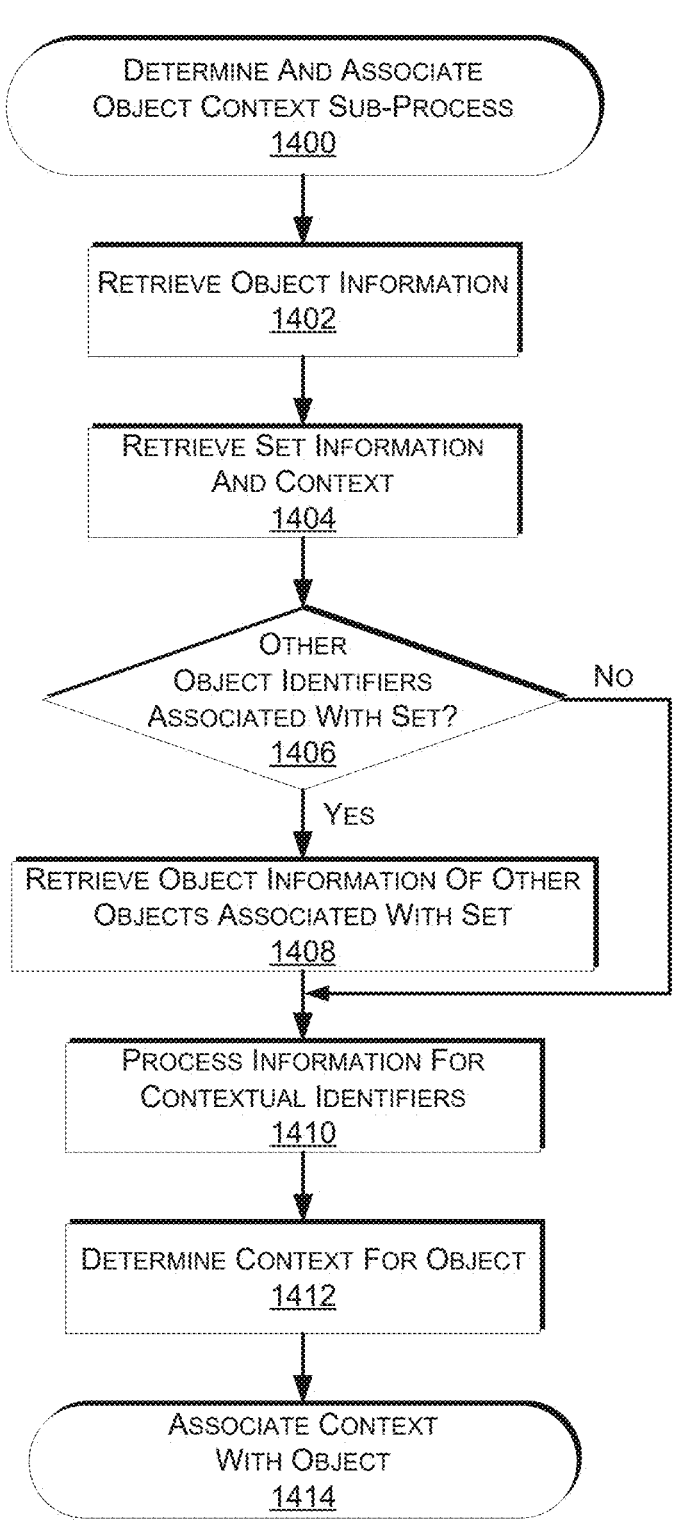
FIG. 14 illustrates an example process for determining and associating object context with an object identifier, according to an implementation.

FIG. 14 illustrates an example sub-process 1400 for determining and associating one or more object contexts with an object identifier, according to an implementation. The example sub-process 1400 begins by retrieving object information, as in 1402. Object information retrieved by the example sub-process 1400 may include, but is not limited to, information associated with the representation of the object, any user provided descriptions of the object, static information associated with the selected representation, etc. In addition to retrieving object information, the example sub-process 1400 may also retrieve set information and context of the set with which the object identifier is to be associated, as in 1404. For example, as discussed above, the set with which the object identifier is to be associated may already include and have a context, selected category, user provided description, static information provided by the user or otherwise associated with the set, etc. Such information may be obtained and used as a factor in determining a context for the object.

The example sub-process 1400 may also determine whether other object identifiers are associated with the set with which the object identifier is to be associated, as in 1406. If it is determined that other object identifiers are associated with the set with which the object identifier is to be associated, object information and context of those other object identifiers may be retrieved and used as a factor in determining a context for the object identifier under consideration, as in 1408.

Once the object information for the object identifier, set information, and object information from any other object identifiers associated with the set have been retrieved, such information may be processed by the example sub-process 1400 to identify contextual information. Contextual information may include, statements provided by the user that allow the example sub-process 1400 to determine or assess the meaning or purpose of the object or set, as understood by the user. Such processing may include a linguistic analysis of the information provided by the user to ascertain a meaning of the object as understood by the user. Processing may include a linguistic analysis of the information provided by the user. Other processing techniques may also be used in conjunction with or as an alternative to linguistic analysis.

Based on the processed information and identified contextual information, the example sub-process 1400 may determine one or more contexts for the object, as in 1412, and associate those contexts with the object identifier that identifies the object, as in 1414.

Figure 15:
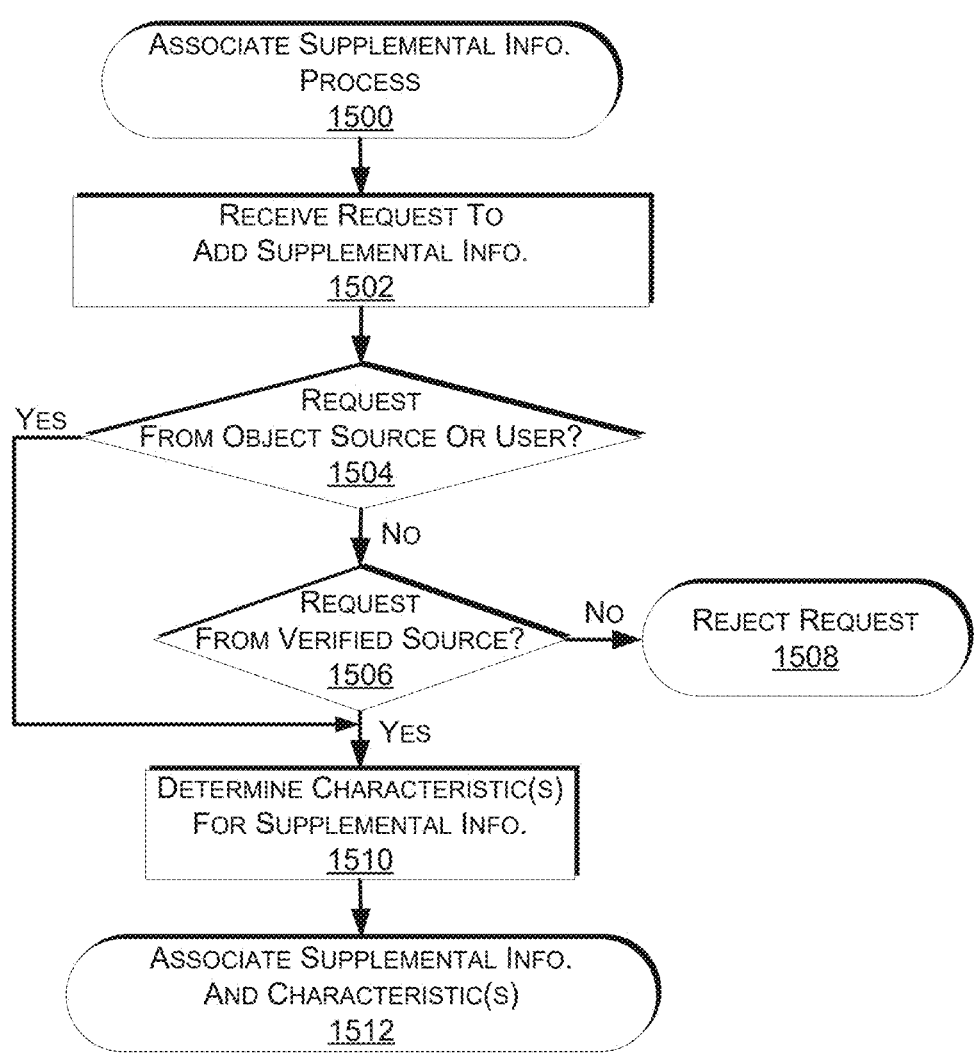
FIG. 15 illustrates an example process for associating supplemental information with a representation, according to an implementation.

FIG. 15 illustrates an example process 1500 for associating supplemental information with a representation, an object identifier and/or a set, according to an implementation. Supplemental information may be associated with any one or combination of a representation, an object identifier and/or a set. The example process 1500 initiates upon receipt of a request to associate supplemental information with a representation of an object, an object identifier and/or a set, as in 1502. For example, external sources may identify existing representations of objects and request to claim or otherwise be associated with those representations so that they may provide supplemental information that is associated with representations of those objects. Alternatively, a user may identify one or more object identifiers that include representations of objects for which they desire to provide supplemental information. In still another implementation, an external source may request to provide supplemental information that is associated with the source and any representations from the source.

In still other implementations, rather than an external source requesting to add supplemental information, a user may identify an external source and request that supplemental information from that external source be provided. For example, if a user has created a set for Hawaii, the user may request that current weather in Hawaii (supplemental information) be provided from an external source and associated with the set.

Once a request to add supplemental information has been received, a determination is made as to whether the request is from a source of the object identified by the representation or from a user that is requesting the supplemental information, as in 1504. As discussed above, a source of the object may be the manufacturer of the object, the original provider of the representation of the object, or other entity that is associated with the object or the representation of the object. If it is determined that the request is not from a source of the object or from the user, a determination is made as to whether the request is from a verified source, as in 1506. As discussed above, a verified source may be any entity already known and verified by the object management service 110.

If it is determined that the request is not from a verified source, the example process 1500 may reject the request, as in 1508. In other implementations, rather than just rejecting the request, the object management service 110 may go through the process of verifying the external source so that it can provide supplemental information.

If it is determined that the request is from a verified source, from the user, or from the source of the object/representation (which is also a verified source), one or more characteristics for the supplemental information to be provided may be determined, as in 1510. Characteristics of the supplemental information may identify the type of information being provided so that when supplemental information is provided as part of an object identifier or a set, only supplemental information that corresponds with the context(s) of the object identifier/set are included. For example, if supplemental information is associated with a representation of the Empire State Building (an object), some supplemental information may include statistical information about the engineering and structural design of the Empire State Building, while other supplemental information may include weather around the Empire State Building, occupants of the Empire State Building, etc. The different items of supplemental information may each have different characteristics. When a representation of the Empire State Building is associated with or included into an object identifier, the context of the object identifier may be considered and only supplemental information with characteristics that correspond with that context may be added or included in the object identifier.

Continuing with the above example, if the context of the object identifier is "great architectural buildings," only supplemental information associated with the representation of the Empire State Building that relates to the engineering or structure of the Empire State Building may be included as supplemental information for that object identifier. In comparison, the supplemental information that includes weather around the Empire State Building, occupants of the Empire State Building, directions to the Empire State Building, etc. may not be included in the object identifier because they do not represent characteristics that correspond with the context of the object identifier.

In some implementations, supplemental information with different characteristics may be associated with the same object, object identifier and/or set and the appropriate supplemental information provided depending on the context when the object identifier and/or set is viewed. For example, if the object identifier is a recipe, it may have contexts of ingredients and preparation. When the object identifier is viewed, the object management service 110 may determine the context in which the user is viewing the object identifier and provide only the supplemental information with the correspond characteristics.

Returning to FIG. 15, once the characteristics for the supplemental information have been determined, the supplemental information and those characteristics may be associated with the representation, object identifier and/or set, as in 1512. The associations may be maintained in the mappings data store 112 and/or the source data store 118.

Figure 16:
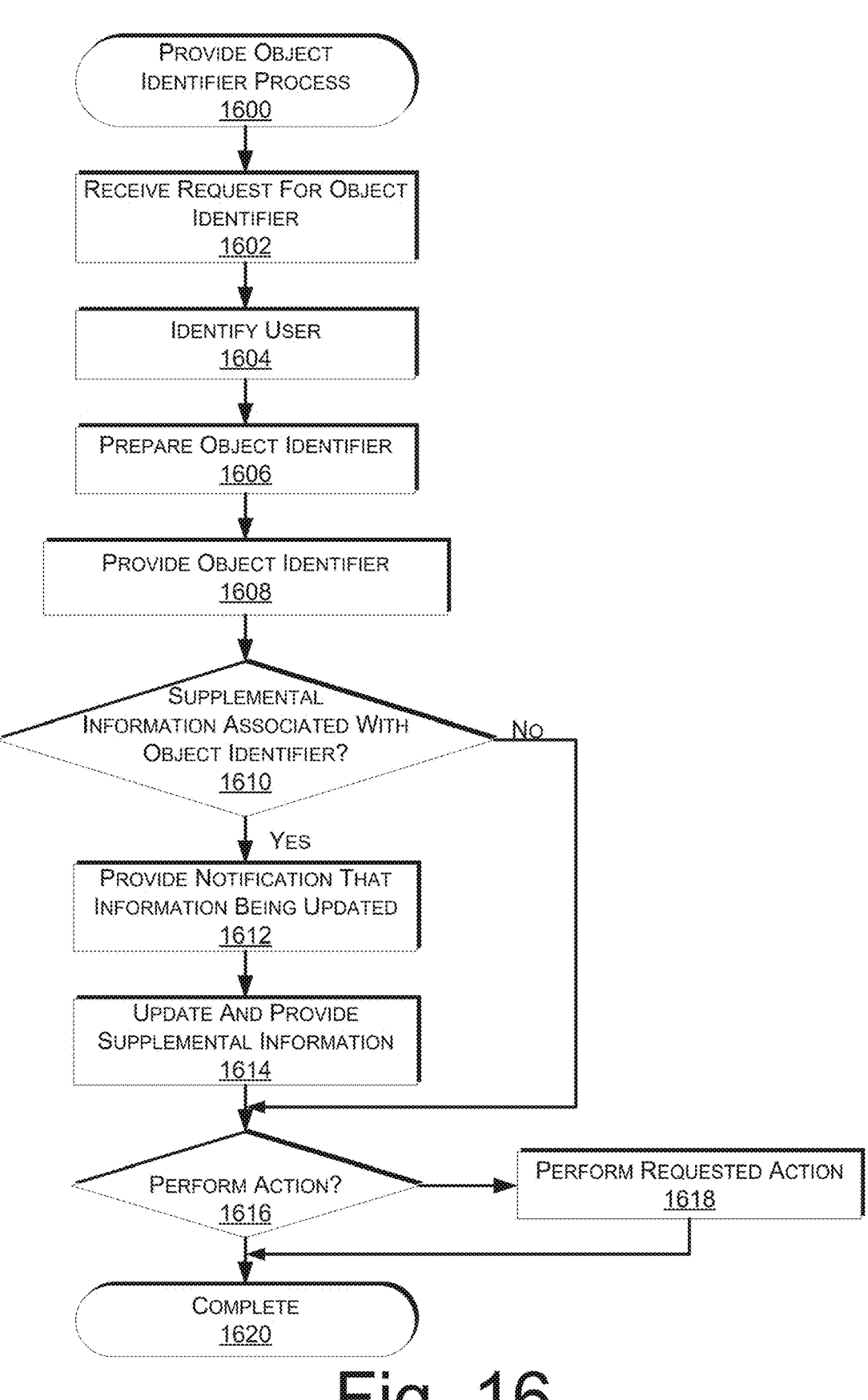
FIG. 16 illustrates an example process for providing an object identifier, according to an implementation.

FIG. 16 illustrates an example process 1600 for providing an object identifier, according to an implementation. The example process 1600 begins by receiving a request to view an object identifier, as in 1602. Upon receiving a request to view an object identifier, the user submitting the request may be identified, as in 1604, and the object identifier prepared for that user, as in 1606.

In some implementations, the prepared object identifier may include different information based on the user that is requesting to view the object identifier and/or the context in which the user is requesting to view the object identifier. For example, if the user requesting to view the object identifier is also the user that created the set into which the object identifier is associated, additional information may be included with the object identifier, such as supplemental information about the object identified by the object identifier, as well as information about other objects in the set with which the object identifier is associated. In comparison, if the user requesting to view the object identifier is not the user that created the object identifier, or the set into which the object identifier is associated, some of the supplemental information and/or user provided information may not be included in the prepared object identifier that is provided to the user requesting to view the object identifier.

As another example, the user's context in which they are viewing the object identifier may be determined and the object identifier prepared accordingly. For example, if the object identifier is a recipe that has multiple contexts (e.g., ingredients and preparation) the location of the user may be determined. If the user is in the grocery store the context may be ingredients, and supplemental information that corresponds with ingredients may be provided in the object identifier. In comparison, if the user is determined to be in their kitchen, the context may be preparation, and the instructions for preparing the recipe may be provided as supplemental information.

In some implementations, other factors may be considered in determining what information to include in a prepared object identifier. For example, if a link to a source is included in the object identifier, that link may be dependent, and change, based on a location of the user requesting to view the object identifier. To illustrate, if the link is a website address to an e-commerce site that allows a user to purchase the identified object, the link may be modified based on the location of the user requesting to view the object identifier. If the user is in the United States, the link provided with the object identifier may direct the user to the .com website. However, if the user is in Japan, the link provided with the object identifier may direct the user to the .jp website.

Once the object identifier has been prepared, the example process 1600 provides or otherwise sends the object identifier to the user requesting to view the object identifier, as in 1608. For example, if the representation included in the object identifier is a graphical representation of an object, the example process 1600 may prepare a graphical object identifier that is sent for display on a client device 104 for presentation to a user.

In addition to providing an object identifier to a user requesting to view the object identifier, the example process 1600 may determine whether supplemental information that is to be updated was provided with the identifier, as in 1610.

If it is determined that supplemental information that is to be updated is included in the object identifier as provided, a notification may be presented to the user that some of the information is being updated, as in 1612. The example process 1600 may update the supplemental information, if needed, and once the updated information is obtained, provide that information to the user viewing the object identifier, as in 1614. In some implementations, updating the supplemental information may include the object management service 110 polling or otherwise requesting the external source(s) that provide the supplemental information for an update. In other implementations, the external sources may periodically, or upon information changes, update the supplemental information proactively. The object management service 110 may obtain updates and automatically provide them for inclusion in the object identifier.

Once the supplemental information has been updated and provided to the user viewing the object identifier, or if it is determined that there is no supplemental information associated with the object identifier being viewed by the user, a determination is made as to whether the user has requested to perform an action, as in 1616. As discussed above, supplemental information may include actions that may be requested or otherwise performed on behalf of a user viewing an object identifier. For example, supplemental information in the form of an action may include a purchase control icon or checkout control that may be used by the user viewing the object identifier to initiate purchase of the object identified by the object identifier. Other actions include, but are not limited to, obtaining additional information about the object identified by the object identifier, traversing to another source or representation of the object, etc. If it is determined that a request to perform an action has been received, the example process 1600 may initiate the performance of the requested action, as in 1618. Upon initiating the request to perform the action, or if it is determined that an action has not been requested, the example process 1600 completes, as in 1620.

Figure 17:
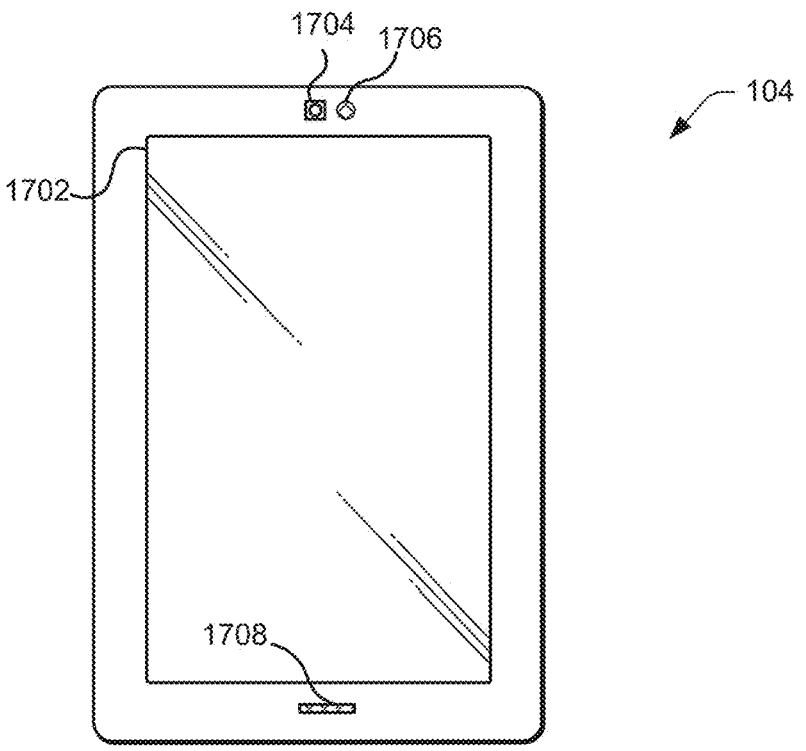
FIG. 17 illustrates an example computing device that can be used in accordance with various implementations.

FIG. 17 illustrates an example client device 104 that can be used in accordance with various implementations described herein. In this example, the client device 104 includes a display 1702 and optionally at least one input component 1704, such as a camera, on a same side of the device as the display 1702. The client device 104 may also include an audio transducer, such as a speaker 1706, and optionally a microphone 1708. Generally, the client device 104 may have any form or input/output components that allow a user to interact with the client device 104. For example, the various input components for enabling user interaction with the device may include a touch-based display 1702 (e.g., resistive, capacitive. Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 18:
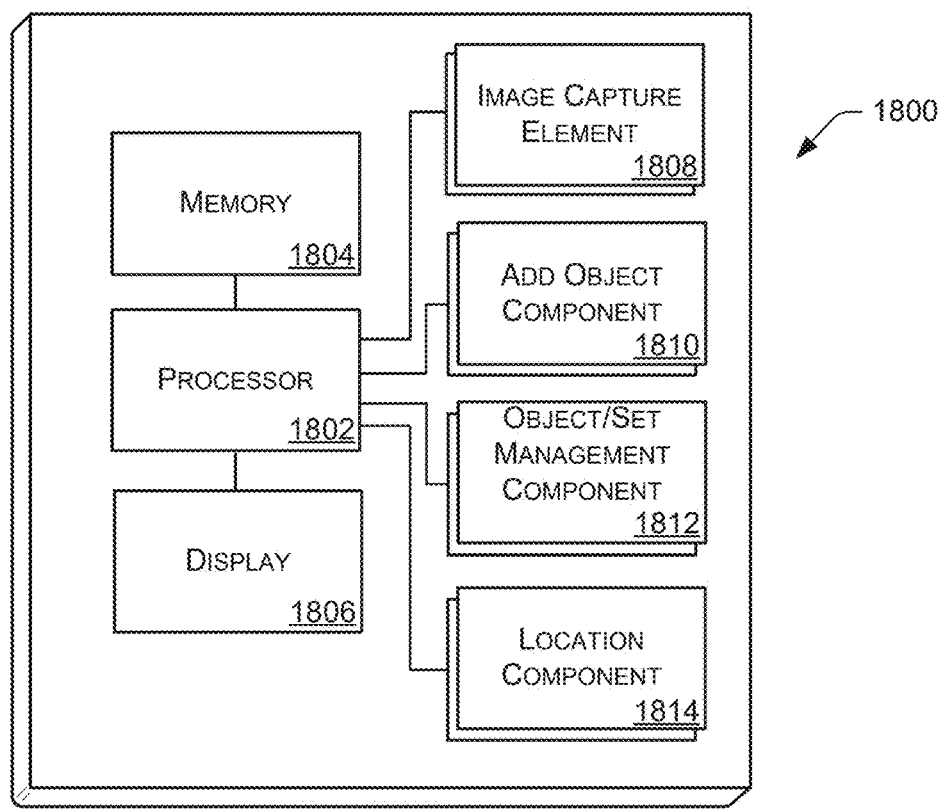
FIG. 18 illustrates an example configuration of components of a computing device, such as that illustrated in FIG. 17.

In order to provide the various functionality described herein, FIG. 18 illustrates an example set of basic components 1800 of a client device 104, such as the client device 104 described with respect to FIG. 17 and discussed herein. In this example, the device includes at least one central processor 1802 for executing instructions that can be stored in at least one memory device or element 1804. As would be apparent to one of ordinary skill in the art, the device can include many types of memory, data storage or computer-readable storage media, such as a first data storage for program instruction for execution by the processor 1802. Removable storage memory can be available for sharing information with other devices, etc. The device typically will include some type of display 1806, such as a touch-based display, electronic ink (e-ink), organic light emitting diode (OLED) or liquid crystal display (LCD).

As discussed, the device in many implementations will include at least one image capture element 1808, such as one or more cameras that are able to image objects in the vicinity of the device. An image capture element can include, or be based at least in part upon any appropriate technology, such as a CCD or CMOS image capture element having a determined resolution, focal range, viewable area, and capture rate. The device can include at least one add object component 1810 for performing the process of creating an object identifier that identifies an object, and/or interacting with the object management service 110 as part of the process of creating an object identifier that identifies an object. For example, the client device may be in constant or intermittent communication with the object management service 110 and may exchange information, such as representations, descriptions, source information, etc. with the object management service 110 as part of the process for creating an object identifier for an object.

The device may also include an object/set management component 1812 that stores and manages information about existing object identifiers and/or sets created by or otherwise associated with the user of the client device. Storing and maintaining such information on the device provides the ability for a user to interact with and use many of the various implementations discussed herein even in the event the client device cannot communicate with the object management service 110.

The device also can include at least one location element 1812, such as GPS, NFC location tracking or Wi-Fi location monitoring. Location information obtained by the location element 1812 may be used with the various implementations discussed herein to identify the location of the user, source location, object location, and the like and support the creation, modification and/or management of sets and/or object identifiers The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 19:
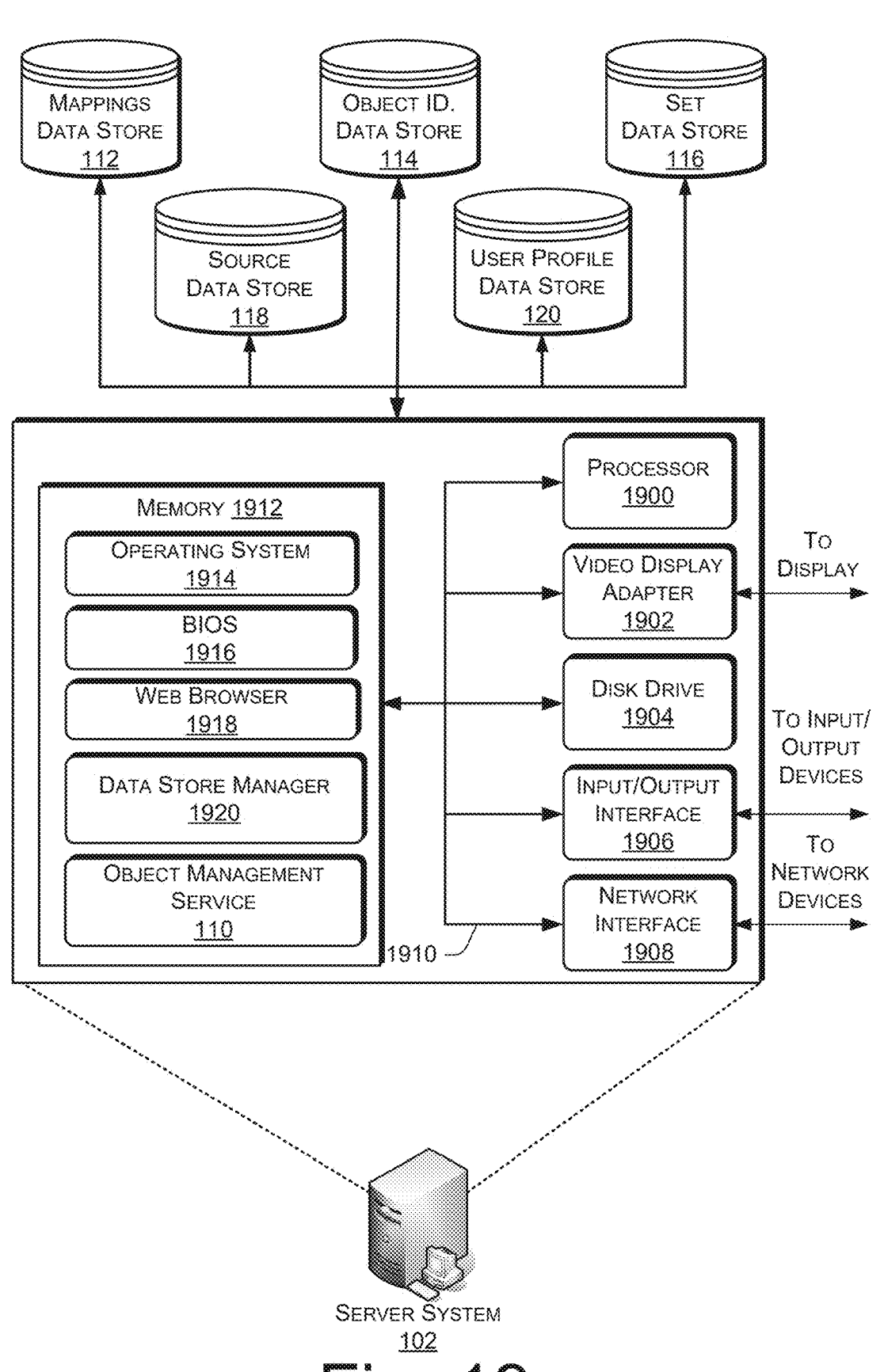
FIG. 19 is a pictorial diagram of an illustrative implementation of a server system that may be used for various implementations.

FIG. 19 is a pictorial diagram of an illustrative implementation of a server system, such as the server system 102, that may be used in the environment of FIG. 1. The server system 102 may include a processor 1900, such as one or more redundant processors, a video display adapter 1902, a disk drive 1904, an input/output interface 1906, a network interface 1908, and a memory 1912. The processor 1900, the video display adapter 1902, the disk drive 1904, the input/output interface 1906, the network interface 1908, and the memory 1912 may be communicatively coupled to each other by a communication bus 1910.

The video display adapter 1902 provides display signals to a local display (not shown in FIG. 19) permitting an operator of the server system 102 to monitor and configure operation of the server system 102. The input/output interface 1906 likewise communicates with external input/output devices not shown in FIG. 19, such as a mouse, keyboard, scanner, or other input and output devices that can be operated by an operator of the server system 102. The network interface 1908 includes hardware, software, or any combination thereof, to communicate with other computing devices. For example, the network interface 1908 may be configured to provide communications between the server system 102 and other computing devices, such as the client device 104, via the network 108, as shown in FIG. 1.

The memory 1912 generally comprises random access memory (RAM), read-only memory (ROM), flash memory, and/or other volatile or permanent memory. The memory 1912 is shown storing an operating system 1914 for controlling the operation of the server system 102. A binary input/output system (BIOS) 1916 for controlling the low-level operation of the server system 102 is also stored in the memory 1912.

The memory 1912 additionally stores program code and data for providing network services that allow client devices 104 and external sources 106 to exchange information and data files with the server system 102 and/or the object management service 110. Accordingly, the memory 1912 may store a browser application 1918. The browser application 1918 comprises computer executable instructions, that, when executed by the processor 1900 generate or otherwise obtain configurable markup documents such as Web pages. The browser application 1918 communicates with a data store manager application 1920 to facilitate data exchange and mapping between the mappings data store 112, the object identifier data store 114, the set data store 116, the source data store 118 and/or the user profile data store 120, client devices, such as the client device 104 shown in FIG. 1 and/or external sources, such as the external sources 106 shown in FIG. 1.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 112-120 as needed to execute aspects of one or more applications for the client device 104, the external sources 106 and/or the object management service 110. The server system 102 provides access control services in cooperation with the data stores 112-120 and is able to generate content such as text, graphics, audio, video and/or object identifier or set related information (e.g., representations, context, descriptions, mappings, analytics about user interfaces) to be transferred to the client device 104 or external sources 106.

The data stores 112-120 can include several separate data tables, databases or other data storage mechanisms and media for storing data relating to a particular aspect. For example, the data stores 112-120 illustrated include mechanisms for storing content, user information, mappings and external source information, representations, which can be used to generate and deliver content to client devices 104 and/or external sources 106 (e.g., sets, object identifiers, representations) and control actions to be performed.

It should be understood that there can be many other aspects that may be stored in the data stores 112-120, such as access rights information, which can be stored in any of the above listed mechanisms as appropriate or in additional mechanisms of any of the data stores 112-120. The data stores 112-120 are operable, through logic associated therewith, to receive instructions from the server system 102 and obtain, update or otherwise process data in response thereto. In one example, an external source might submit a request to associate supplemental information with a representation of an object. In this case, the source data store 118 might access the source's profile information to verify the source and whether the source is associated with the representation. The information can then be returned to the user, such as in user interface delivered to a client device 104 that the user is able to view.

The memory 1912 may also include the object management service 110, discussed above. The object management service 110 may be executable by the processor 1900 to implement one or more of the functions of the server system 102. In one implementation, the object management service 110 may represent instructions embodied in one or more software programs stored in the memory 1912. In another implementation, the object management service 110 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction in FIG. 19 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more computing systems configured with executable instructions,
receiving, via a network and at an object management service, from a first device associated with a first user, a first representation of a physical object;
receiving a request from the first user to add an object identifier associated with the first representation of the physical object to a set of object identifiers, wherein the set is associated with a context identifying a semantic meaning to the first user of objects represented by the one or more object identifiers in the set;
determining, by one or more processors, contextual information for the first representation of the physical object, the contextual information comprising information associated with the first representation of the physical object and information associated with the first user, the context information including the context associated with the set;
receiving, from one or more external sources different from the first user, a respective request to add one or more items of supplemental information associated with the first representation, wherein the one or more items of supplemental information are distinct from the determined contextual information;

determining, by one or more processors, that at least one item of the one or more items of supplemental information includes one or more characteristics that correspond to the contextual information;

selecting for inclusion with the object identifier the at least one item of supplemental information that includes one or more characteristics that correspond to the contextual information;

creating the object identifier associated with the first representation, the object identifier including the contextual information, the at least one item of supplemental information, and an identifier or the set of object identifiers;

determining, via the object management service and based at least in part on the object identifier, a first item that is related to the first representation of the physical object and available for purchase from the external source using a first control;

storing, by the object management service, a first association between at least the first control and the first representation, wherein the first control includes a link including a network address to the external source;

receiving, by the object management service, a second request from the first device for the first representation; and sending, by the object management service and for presentation to the first device, at least the first representation and the first control, such that the first control is selectable by the first user to purchase the first item via the external source.

2. The computer-implemented method of claim 1, further comprising:

receiving, from a second device associated with a second user, a first textual description for the first representation;

determining a second item based at least in part on the first textual description, the second item available for purchase from the external source using a second control;

storing a second association between at least the second control and the first representation;

receiving a third request for the first representation from the second device; and sending, for presentation to the second device, the first representation and the second control, such that the second user may select the second control to purchase the second item via the external source.

3. The computer-implemented method of claim 2, further comprising:

including, using the object identifier, the first representation in the set of object identifiers;

receiving, from the second device, a fourth request to associate the first representation with a second set of object identifiers;

receiving, from the second device, a second textual description for the second set;

determining, based at least in part on the second textual description for the second set, a third control to enable purchase of a third item;

storing a fourth association between at least the first representation and the third control;

receiving, from the second device, a fifth request for the first representation; and sending the third control to the second device, such that the second user may select to purchase the third item from the external source.

4. The computer-implemented method of claim 1, further comprising:

identifying the external source based at least in part on first location information that is indicative of a first geographic location where the first representation was captured;

sending a request to the external source; and receiving the first control from the external source.

5. The computer implemented method of claim 1, further comprising:

receiving a search query from a second device that is associated with a second user, the search query directed to at least content associated with the first user;

receiving, from the second device, a third request for the first representation;

identifying the first control based at least in part on the first association, the search query, and the third request; and sending the first control for presentation on the second device, such that the second user may select the first control to purchase the first item.

6. The computer implemented method of claim 1, further comprising:

providing a collection of representations to a second device that is associated with a second user, wherein the collection of representations includes the first representation;

receiving, from the first device, a first textual description for the first representation;

receiving, from the second device, a second textual description for the first representation;

determining a context for the first representation based at least in part on the first textual description and the second textual description for the first representation; and wherein the determining the request for the first control is further based at least in part on the context.

7. The computer implemented method of claim 1, wherein the first control is updated by the external source prior to sending, for presentation to the first device, at least the first representation and the first control.

8. The computer implemented method of claim 1, further comprising:

determining the physical object at least in part by analyzing content of the first representation;

storing a second association between at least the physical object and the first representation; and wherein the determining the request for the first control is further based at least in part by identifying the external source as a seller of the physical object.

9. The computer implemented method of claim 1, further comprising:

receiving, from the first device associated with the first user, additional information about the first representation including location information about the first representation, wherein the additional information is distinct from the contextual information and the supplemental information; and associating the additional information with the object identifier.

10. The computer implemented method of claim 1, wherein the supplemental information includes variable information associated with the physical object that is periodically updated by one or more external sources for presentation to the first device in response to a request for the first representation.

11. A non-transitory computer-readable storage medium storing instructions, the instructions, when executed by one or more processors, causing the one or more processors to at least:

receive, from a device associated with a user and at an object management service, a representation of a physical object;

receive a request from the user to add an object identifier associated with the first representation of the physical object to a set of object identifiers, wherein the set is associated with a context identifying a semantic meaning to the user of objects represented by the one or more object identifiers in the set;

determine contextual information for the first representation of the physical object, the contextual information comprising information associated with the first representation of the physical object and information associated with the user, the context information including the context associated with the set;

receive, from one or more external sources different from the user, a respective request to add one or more items of supplemental information associated with the representation, wherein the one or more items of supplemental information are distinct from the determined contextual information;

determine that at least one item of the one or more items of supplemental information includes one or more characteristics that correspond to the contextual information;

select for inclusion with the object identifier the at least one item of supplemental information that includes one or more characteristics that correspond to the contextual information;

create the object identifier associated with the first representation, the object identifier including the contextual information the at least one item of supplemental information, and an identifier for the set of object identifiers;

determine, via the object management service and based at least in part on the object identifier, an item related to the representation of the physical object and available for purchase from the external source using a control, wherein the control includes a link including a network address to the external source;

store, by the object management service, an association between at least the control and the representation;

receive, by the object management service, a second request from the device for the representation; and send, by the object management service and for presentation on the device, the control, such that the control is selectable by the user to purchase the item via the external source.

12. The non-transitory computer-readable storage medium of claim 11, the instructions, when executed by the one or more processors, further causing the one or more processors to at least:

send to the device the representation for presentation with the control.

13. The non-transitory computer-readable storage medium of claim 11, further comprising:

receiving, from the device associated with the user, additional information about the first representation including location information about the first representation; and associating the additional information with the object identifier.

14. A computing system, comprising:

one or more processors; and a memory coupled to the one or more processors and storing program instructions that, when executed by the one or more processors, cause the one or more processors to at least:

receive, from a device that is associated with a user and at an object management service, a first representation of a physical object;

receive a request from the user to add an object identifier associated with the first representation of the physical object to a set of object identifiers, wherein the set is associated with a context identifying a semantic meaning to the user of objects represented by the one or more object identifiers in the set;

determine contextual information for the first representation of the physical object, the contextual information comprising information associated with the first representation of the physical object and information associated with the use, the context information including the context associated with the set r;

receive, from one or more external sources different from the user, a respective request to add one or more items of supplemental information associated with the first representation, wherein the one or more items of supplemental information are distinct from the determined contextual information;

determine that at least one item of the one or more items of supplemental information includes one or more characteristics that correspond to the contextual information;

select for inclusion with the object identifier the at least one item of supplemental information that includes one or more characteristics that correspond to the contextual information;

create the object identifier associated with the first representation, the object identifier including the contextual information the at least one item of supplemental information, and an identifier for the set of object identifiers;

determine, via the object management service and based at least in part on the object identifier, an item that is related to the first representation of the physical object and available for purchase from the external source using a control;

store, by the object management service, an association between the control and the first representation;

receive, from the device and at the object management service, a second request for the first representation;

update, by the object management service, an attribute of the control from the external source; and send, by the object management service, the first representation and the control with the attribute to the device for presentation, such that the control with the attribute is selectable by the user to purchase the item via the external source.

15. The computing system of claim 14, further comprising:

receiving, from the device associated with the user, additional information about the first representation including location information about the first representation wherein the additional information is distinct from the contextual information and the supplemental information; and associating the additional information with the object identifier.

16. The computing system of claim 14, wherein:

the control is associated with a price of the item; and updating the attribute of the control includes updating the price of the item.

17. The computing system of claim 14, wherein the program instructions, when executed by the one or more processors, further cause the one or more processors to at least:

determine the physical object at least in part by analyzing content of the first representation;

store a second association between at least the physical object and the first representation; and wherein determination of the request for the control is further based at least in part by identifying the external source as a seller of the physical object.

18. One or more non-transitory computer readable media storing computer-executable instructions that, when executed on one or more processors, cause the one or more processors to perform acts comprising:

receiving, from a device that is associated with a user and at an object management service, a first representation of a physical object, wherein the physical object is determined by analyzing content of the first representation;

receiving a request from the user to add an object identifier associated with the first representation of the physical object to a set of object identifiers, wherein the set is associated with a context identifying a semantic meaning to the user of objects represented by the one or more object identifiers in the set;

determining contextual information for the first representation of the physical object, the contextual information comprising information associated with the first representation of the physical object an information associate with the user, the context information including the context associated with the set;

receiving, from one or more external sources different from the user, a respective request to add one or more items of supplemental information with the first representation, wherein the one or more items of supplemental information are distinct from the determined contextual information;

determining that at least one item of the one or more items of supplemental information includes one or more characteristics that correspond to the contextual information;

selecting for inclusion with the object identifier the at least one item of supplemental information that includes one or more characteristics that correspond to the contextual information;

creating the object identifier associated with the first representation, the object identifier including the contextual information the at least one item of supplemental information, and an identifier for the set of object identifiers;

including, using the object identifier and by the object management service, the first representation in a set, wherein the set further includes a second representation;

determining, by the object management service and based at least in part on the object identifier, an item that is related to the physical object and available for purchase from the external source using a control;

storing, by the object management service, an association between at least the control and the set;

receiving, from the device and at the object management service, a request for the second representation; and sending, by the object management service and for presentation on the device, the control, such that the control is selectable by the user to purchase the item via the external source.

19. The one or more non-transitory computer readable as recited in claim 18, the acts further comprising:

subsequent to the request being received, updating the control.

20. The one or more non-transitory computer readable media as recited in claim 19, further comprising:

receiving, from the device associated with the user, additional information about the first representation including location information about the first representation; and associating the additional information with the object identifier.

21. The one or more non-transitory computer readable media as recited in claim 18, the acts further comprising:

receiving, from the device, a first textual description for the set;

sending for presentation on a second device that is associated with a second user, a plurality of representations, wherein the plurality of representations includes the second representation;

determining a context for the set based at least in part on the first textual description;

storing a second association between at least the second representation and the context;

receiving, from the second device, a second textual description for the second representation;

identifying the context based at least in part on the second representation and the second association;

determining, based at least in part on the context and the second textual description, a second item that is related to the second representation and available for purchase from the external source via a second control;

receiving, from the second device, a second request for the second representation; and in response to receiving the second request, sending for presentation on the second device, the second control, such that the second user may select the second control to initiate purchase of the second item via the external source.

* * * * *